United States Patent
Li et al.

(10) Patent No.: US 11,664,890 B2
(45) Date of Patent: May 30, 2023

(54) SERVICE PROCESSING METHOD, CONTROL DEVICE, AND STORAGE MEDIUM

(71) Applicant: Huawei Technologies Co., Ltd., Shenzhen (CN)

(72) Inventors: Guangzhi Li, Shenzhen (CN); Kerong Yan, Dongguan (CN); Bin Xia, Dongguan (CN)

(73) Assignee: Huawei Technologies Co., Ltd., Shenzhen (CN)

( * ) Notice: Subject to any disclaimer, the term of this patent is extended or adjusted under 35 U.S.C. 154(b) by 148 days.

(21) Appl. No.: 17/145,120

(22) Filed: Jan. 8, 2021

(65) Prior Publication Data

US 2021/0135750 A1     May 6, 2021

Related U.S. Application Data

(63) Continuation of application No. PCT/CN2019/095248, filed on Jul. 9, 2019.

(30) Foreign Application Priority Data

Jul. 9, 2018   (CN) .......................... 201810746393.9

(51) Int. Cl.
*H04B 10/03*     (2013.01)
*H04B 10/25*     (2013.01)
*H04J 14/02*     (2006.01)

(52) U.S. Cl.
CPC ............. *H04B 10/03* (2013.01); *H04B 10/25* (2013.01); *H04J 14/02* (2013.01)

(58) Field of Classification Search
CPC .... H04B 10/03; H04B 10/032; H04B 10/038; H04B 10/25; H04B 10/035; H04B 10/0771; H04B 10/0791; H04B 10/0795; H04Q 2011/0081; H04Q 11/0062; H04Q 2011/0073; H04J 14/02; H04J 14/0293; H04J 14/0269; H04J 14/0297; H04L 45/62
USPC ............................................ 398/2, 3, 4, 5, 7
See application file for complete search history.

(56) References Cited

U.S. PATENT DOCUMENTS

| | | | |
|---|---|---|---|
| 2006/0210266 A1* | 9/2006 | Aoki | .................. H04J 14/0297 |
| | | | 398/19 |
| 2013/0216215 A1 | 8/2013 | Chan et al. | |
| 2017/0054524 A1 | 2/2017 | Gumaste et al. | |

(Continued)

FOREIGN PATENT DOCUMENTS

| | | |
|---|---|---|
| CN | 1684381 A | 10/2005 |
| CN | 101645750 A | 2/2010 |
| CN | 101651625 A | 2/2010 |

(Continued)

*Primary Examiner* — Hibret A Woldekidan
(74) *Attorney, Agent, or Firm* — Slater Matsil, LLP

(57) ABSTRACT

A method includes: determining, by the control device, that a site receives a first service; determining that a mapping wavelength of a first service is blocked on an original routing path, where the original routing path includes a first line board connected to a first local dimension, and a wavelength occupied by the first local dimension includes the mapping wavelength of the first service; and routing, by the control device, the first service to a second line board connected to a second local dimension, where the mapping wavelength of the first service is available in the second local dimension.

20 Claims, 16 Drawing Sheets

(56) References Cited

U.S. PATENT DOCUMENTS

2018/0006931 A1    1/2018   Ellis et al.

FOREIGN PATENT DOCUMENTS

| CN | 101834667 | A  | 9/2010 |
| CN | 102158300 | A  | 8/2011 |
| CN | 104734799 | A  | 6/2015 |
| WO | 2012088978 | A1 | 7/2012 |

* cited by examiner

SERVICE PROCESSING METHOD, CONTROL DEVICE, AND STORAGE MEDIUM

CROSS-REFERENCE TO RELATED APPLICATIONS

This application is a continuation of International Application No. PCT/CN2019/095248, filed on Jul. 9, 2019, which claims priority to Chinese Patent Application No. 201810746393.9, filed on Jul. 9, 2018. The disclosures of the aforementioned applications are hereby incorporated by reference in their entireties.

TECHNICAL FIELD

The present invention relates to the field of optical communications technologies, and in particular, to a service processing method, a control device, and a storage medium.

BACKGROUND

In a wavelength division network, different sites are connected to each other over an optical fiber. FIG. 1 shows a structure 100 of each site. The site mainly includes line boards on a transmit side that are connected to a multiplexer or a coupler (MUX) 1, line boards connected to a MUX 2, wavelength selective switches (WSS) on a network side, which are also referred to as line dimensions, such as a WSS 1, a WSS 2, and a WSS 3, and wavelength selective switches on an add/drop side, which are also referred to as local dimensions, such as a WSS 4 or a WSS 5. The local dimensions are fully connected to the line dimensions, and the line dimensions are fully connected to each other.

An optical cross-connect (OXC) structure of the site mainly includes a WSS in a colorless directionless (CD) mode. A port (Tx/Rx) of each local dimension (that is, the WSS located on the add/drop side) may transmit or receive an optical signal of any wavelength in any line direction. However, ports of a same local dimension cannot transmit or receive two optical signals of a same wavelength. If two optical signals of a same wavelength are received, service blocking occurs.

For example, as shown in FIG. 1, an optical signal that is output from the WSS 4 may be sent to the WSS 1, the WSS 2, and the WSS 3 through cross-connection. It is assumed that the service 1 is sent from the WSS 4 to the WSS 1 through cross-connection by using an optical signal of a wavelength $\lambda 1$. If an external optical fiber connected to the WSS 1 is faulty, the service 1 needs to be rerouted to the WSS 2 by using an optical signal of a wavelength $\lambda 2$. Although the WSS 2 does not occupy the wavelength $\lambda 2$, another service 2 is transmitted to the WSS 3 through the WSS 4 by using an optical signal of the wavelength $\lambda 2$. In other words, the WSS 4 has occupied the wavelength $\lambda 2$. In this case, the service 1 is blocked on the WSS 4 because the WSS 4 has occupied the wavelength $\lambda 2$. Consequently, the service 1 fails to be rerouted.

If a wavelength division network including a site in which a service is blocked is in a static operations and maintenance mode, a planning tool can be used to reduce service blocking impact. However, a future wavelength division network is mainly in a dynamic operations and maintenance mode, for example, an automatically switched optical network (ASON), and cannot use the planning tool to reduce wavelength blocking impact.

SUMMARY

This application provides a service processing method and a control device, to resolve a technical problem that service transmission fails because a mapping wavelength of a service is blocked on an original routing path in a site of an existing CD OXC structure.

According to a first aspect, an embodiment of this application provides a service processing method. The method includes: determining, by a control device, that a site receives a first service; determining, by the control device, that a mapping wavelength of the first service is blocked on an original routing path, where the original routing path includes a first line board connected to a first local dimension, and a wavelength occupied by the first local dimension includes the mapping wavelength of the first service; and routing, by the control device, the first service to a second line board connected to a second local dimension, where the mapping wavelength of the first service is available in the second local dimension.

In this embodiment of this application, the site receives the first service. If the first service is transmitted from the first line board included in the original routing path, and the original routing path includes the first line board connected to the first local dimension, the first service is transmitted from the first line board to the first local dimension connected to the first line board. However, because the wavelength occupied by the first local dimension includes the mapping wavelength of the first service, in other words, because the mapping wavelength of the first service is unavailable in the first local dimension, the first service cannot be transmitted in the first local dimension, and the mapping wavelength of the first service is blocked on the original routing path. Consequently, the first service fails to be transmitted. In this embodiment of this application, to prevent the first service from failing to be transmitted, the first service is routed to the second line board connected to the second local dimension. Because the mapping wavelength of the first service is available in the second local dimension, the first service may be successfully transmitted in the second local dimension. This can resolve a problem that the service fails to be transmitted because the mapping wavelength of the first service is blocked on the original routing path in an existing site of a CD OXC structure.

In a possible design, to further ensure that the first service is routed to the second line board in the second local dimension without affecting normal service transmission in the second local dimension, the first service may be routed to the second line board in the second local dimension in the following manners: If the second line board is in an idle state, the first service is routed to the second line board in the second local dimension. Therefore, the first service can be directly routed to the second line board without affecting normal service transmission in the second local dimension. Alternatively, if the second line board is in a working state of processing a second service, the second service processed by the second line board is routed to a third line board connected to a third local dimension, and the first service is routed to the second line board, where a mapping wavelength of the second service is available in the third local dimension. The second line board is in an idle state after the second service is routed to the third line board, and then the first service is routed to the second line board. Therefore, the first service may be transmitted in the second local dimension without blocking and without affecting normal service transmission in the second local dimension.

In a possible design, when the second line board is in the working state of processing the second service, to implement uninterrupted transmission of the second service in a process of routing the second service to the third line board connected to the third local dimension, the control device may adjust an operating wavelength of the third line board to the mapping wavelength of the second service; control the second service to be sent to the second line board and the third line board, where a direction in which the second service is output from the second line board includes a first line dimension connected to the second local dimension; adjust the third local dimension to connect to the first line dimension, where a direction in which the second service is output from the third line board includes the first line dimension connected to the third local dimension; then control the first line dimension to receive a signal of the second service sent from the third line board; and cancel sending of the second service to the second line board.

According to this design, the second service originally sent only to the second line board may be sent to both the second line board and the third line board currently, and the third local dimension connected to the third line board is controlled to connect to the first line dimension. In other words, currently, the second local dimension is connected to the first line dimension, and the third local dimension is also connected to the first line dimension. Therefore, the first line dimension at an optical layer can receive a signal of the second service transmitted from the second local dimension, and can also receive a signal of the second service transmitted from the third local dimension. Then the first line dimension is controlled to receive the signal of the second service sent from the third line board, and the sending of the second service to the second line board is cancelled. The first line dimension receives only the second service that is transmitted from the third line board to the third local dimension and that is transmitted from the third local dimension. It can be learned that, before the first line dimension receives the second service transmitted from the third local dimension, the first line dimension may still receive the second service transmitted by the second local dimension, so that the second service can be transmitted to the first line dimension without interruption.

Further, the first line dimension is controlled to receive the signal of the second service sent from the third line board, and the sending of the second service to the second line board is cancelled. Therefore, the second line board can be in an idle state, so that the first service can be routed to the idle-state second line board. In addition, the mapping wavelength of the first service is available in the second local dimension, so that the first service can be transmitted in the second local dimension without blocking.

In a possible design, the service processing method provided in this embodiment of this application is applicable to a plurality of scenarios. For example, the first service is a service newly delivered to the site. For another example, a line board that receives the first service is faulty. For another example, an optical fiber for transmitting the first service is faulty. For the plurality of scenarios above, when the original routing path includes the first line board connected to the first local dimension, and the wavelength occupied by the first local dimension includes the mapping wavelength of the first service, the following manner may be provided to determine that the mapping wavelength of the first service is blocked on the original routing path: If the control device determines, before the first service is transmitted to the first line board, that the mapping wavelength of the first service is blocked on the original routing path, or determines that the first line board connected to the first local dimension is faulty, or determines that an optical fiber connected to a line dimension connected to the first local dimension is faulty, the control device determines that the mapping wavelength of the first service is blocked on the original routing path, and then the control device may route, in time, the first service to the second line board connected to the second local dimension, so as to ensure that the first service can be successfully transmitted.

In a possible design, if the control device determines, based on a fact that an optical fiber connected to a line dimension connected to the first local dimension is faulty, that the mapping wavelength of the first service received by the site is blocked on the original routing path, the control device may determine that the faulty optical fiber has been recovered. After the faulty optical fiber has been recovered, the control device may select to continue to transmit the first service on the second line board connected to the second local dimension, or may select to route the first service from the second line board connected to the second local dimension to the first line board connected to the first local dimension. In this way, more selections can be provided for transmitting the first service.

According to a second aspect, an embodiment of this application provides a control device, including a processor and a memory. The memory is configured to store a program instruction. The processor is configured to read the instruction in the memory, so that when the processor executes the program instruction stored in the memory, the processor performs the method in any one of the first aspect and the possible designs of the first aspect.

According to a third aspect, an embodiment of this application provides a control device, configured to implement the method in any one of the first aspect and the possible designs of the first aspect. The control device includes corresponding function units respectively configured to implement steps in the foregoing method. The function units may be implemented by hardware, or may be implemented by hardware executing corresponding software. The hardware or the software includes one or more units corresponding to the foregoing function.

According to a fourth aspect, an embodiment of this application provides a computer storage medium. The computer storage medium stores a computer-executable instruction, and when the computer-executable instruction is invoked by a computer, the computer is enabled to perform the method in any one of the first aspect and the possible designs of the first aspect.

DETAILED DESCRIPTION OF ILLUSTRATIVE EMBODIMENTS

Figure 1:
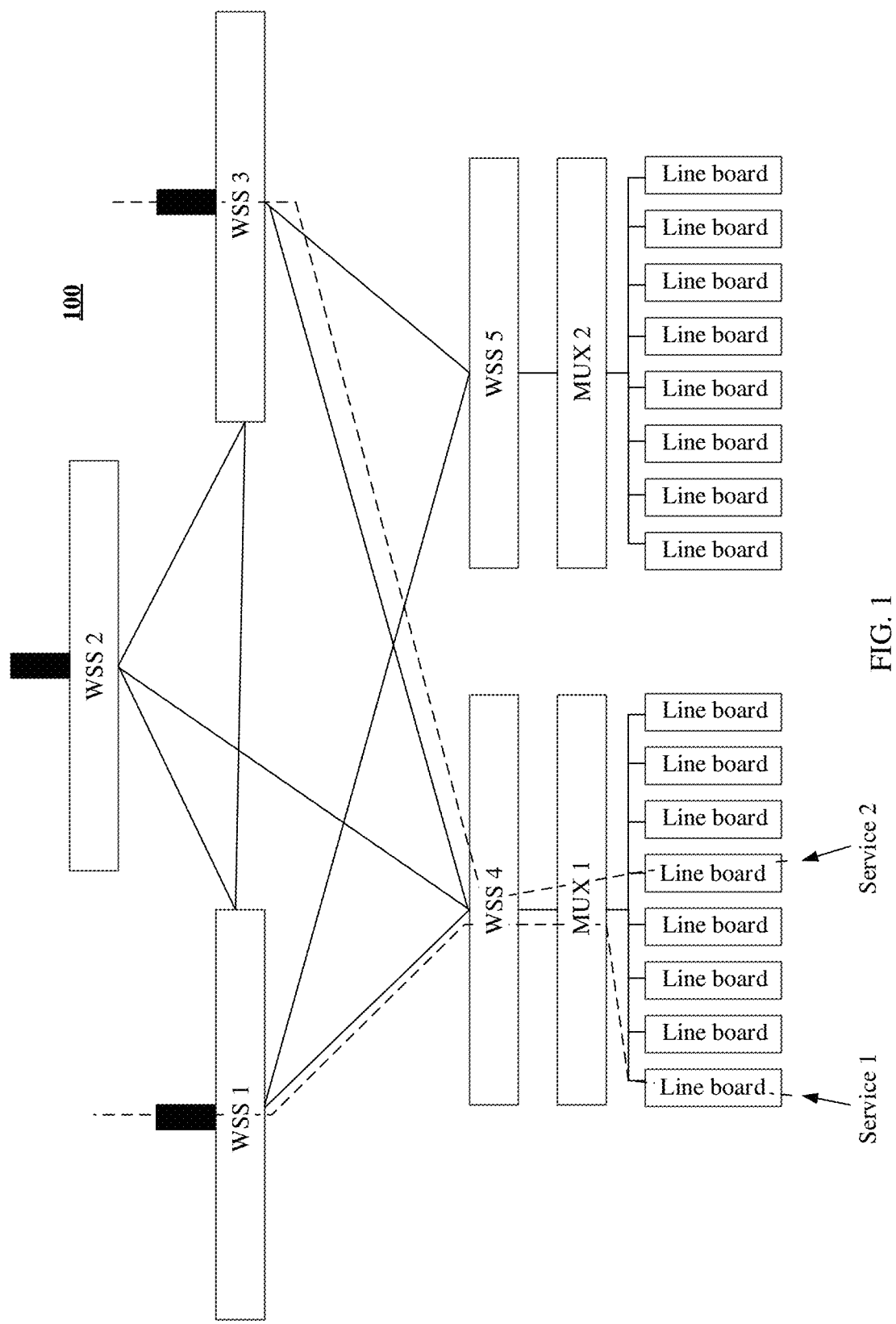
FIG. 1 is a schematic structural diagram 100 of a site in the prior art.
Figure 2:
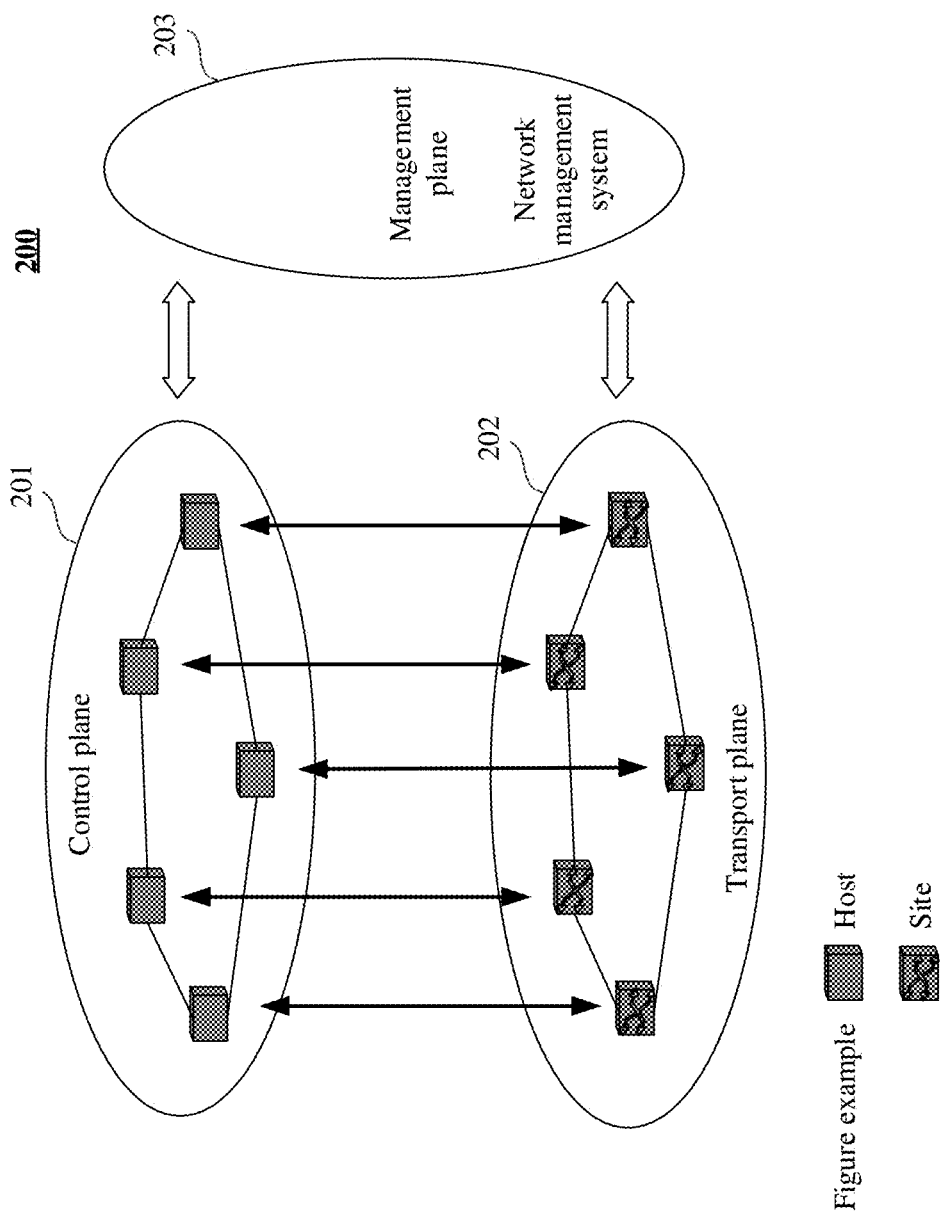
FIG. 2 is a schematic diagram of a system structure of an automatically switched optical network (ASON) 200 applicable to an embodiment of this application.

FIG. 2 is an example of a schematic diagram of a system structure of an automatically switched optical network 200 applicable to an embodiment of this application. Functionally, the automatically switched optical network 200 includes a control plane 201, a transport plane 202, and a management plane 203. The following briefly describes the components shown in FIG. 2.

The control plane 201 includes a group of communications entities, such as hosts shown in FIG. 2. The control plane 201 is responsible for completing call control and connection control functions and recovering a connection when a fault occurs, and is supported by a signaling network. The control plane can collect and spread network topology information, and configure, reconfigure, or modify a service connection quickly and effectively. As shown in FIG. 2, each host corresponds to one site, and the host stores site information, for example, board information, information indicating whether a line board is idle, and a routing path of a service. If the service is blocked, the routing path of the service may include a rerouting path used for transmitting the service after the service is blocked, and an original routing path used for transmitting the service before the service is blocked.

The transport plane 202 is responsible for completing functions such as optical signal transmission, multiplexing, configuration protection switching, and cross-connection, and ensuring reliability of a transmitted optical signal. As shown in FIG. 2, the transport plane includes a plurality of sites (also referred to as network nodes), and any two sites are connected to each other over an external optical fiber. For a site structure, refer to FIG. 3.

The management plane 203 completes a function of managing the control plane and the transport plane. The control plane and the transport plane report respective management information such as alarms, performance, and events to the management plane. The management plane ensures cooperation of all the planes. As shown in FIG. 2, the management plane includes a network management system. When receiving an alarm, the network management system may determine whether a line board fault, an optical fiber fault, or the like occurs, or may detect whether a tributary board receives a new service.

Figure 3:
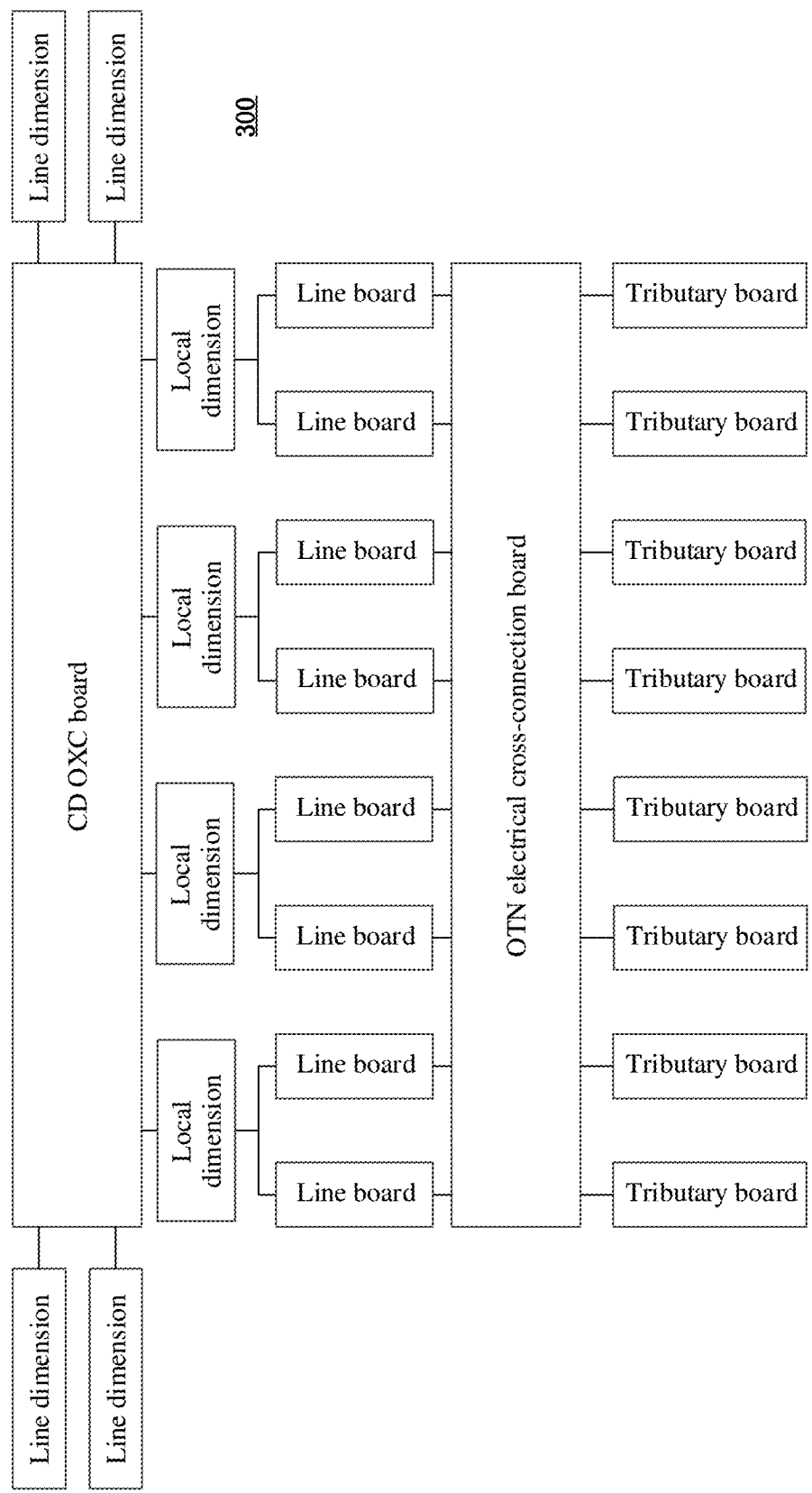
FIG. 3 is a schematic structural diagram of a site 300 applicable to an embodiment of this application.

FIG. 3 is an example of a schematic structural diagram of a site 300 applicable to an embodiment of this application.

The site 300 includes various subracks configured to insert a board, for example, an electrical subrack configured to insert an electrical-layer board. The electrical-layer board mainly includes a tributary board, an optical transport network (OTN) electrical cross-connect board, a line board, a control board in the electrical subrack, and the like. A controller configured to control each electrical-layer board is installed on the control board. The electrical subrack mainly converts a client-side signal into an optical signal of a standard wavelength for grooming by an optical subrack.

For another example, the optical subrack is configured to insert an optical-layer board. The optical-layer board mainly includes a local dimension (that is, a WSS located on an add/drop side), a CD OXC board, a line dimension (that is, a WSS located on a network side), a control board in the optical subrack, and the like. A controller configured to control each optical-layer board is installed on the control board. The optical subrack mainly grooms and manages an optical signal in an OTN.

Only the tributary boards, the OTN electrical cross-connect board, the line boards, the local dimensions, the CD OXC board, and the line dimensions are shown in a structure of the site 300 shown in FIG. 3. The tributary boards are connected to the OTN electrical cross-connect board, the OTN electrical cross-connect board is connected to the line boards, and the line boards are connected to the local dimensions.

After the tributary board performs optical-electrical (O/E) conversion on client-side services of different service granularities that access the site, such as a packet service, a synchronous transport module level N (STM-N) service, a fiber channel (FC) service, a gigabit Ethernet (GE) service, and a 10 GE service, the tributary board maps the client-side services into optical channel data unit (ODU) k signals, where k=1, 2(e), 3, 4, or flex; and sends the ODUk signals to the OTN electrical cross-connect board to groom the ODUk signals to the line board. The line board multiplexes and maps the groomed ODUk signals, performs electrical-optical (E/O) conversion on the ODUk signals to obtain optical transponder unit (OTU) k signals that each have a standard wavelength and satisfy a wavelength division multiplexing (WDM) system requirement, and transmits the OTUk signals to the network side by using the local dimension.

For example, one OTN electrical cross-connect board may correspond to a plurality of local dimensions. As shown in FIG. 3, each OTN electrical cross-connect board corresponds to four local dimensions. In other words, the OTN electrical cross-connect board may groom a signal received by any tributary board, and transmit, through cross-connection, the signal to a line board connected to any one of the four local dimensions shown in FIG. 3.

In this embodiment of this application, any two line dimensions in the site are fully connected to each other. The line dimension is configured to control to select different wavelengths. The line dimension in the site may be connected to a line dimension in another site over an external optical fiber. Each line dimension is also fully connected to each local dimension. In other words, an optical signal that is output by each local dimension may be input to any line dimension through an optical cross-connect path inside the CD OXC board.

For example, each local dimension may be configured to connect to a plurality of line boards. For example, in FIG. 3, each local dimension is provided with two line boards. During actual network operations and maintenance, a line board is installed in a site in advance. A specific quantity of line boards may be set according to an actual requirement. This is not limited herein.

In the embodiments of this application, for one site, there are a plurality of manners of determining a routing path of a service and controlling switching of the routing path. An example in which a site receives a first service is used. In an implementation, with reference to FIG. 2 and FIG. 3, in the system architecture shown in FIG. 2, the network management system in the management plane 203 may determine a routing path of the first service, and controls the controller in the optical subrack and the controller in the electrical subrack in the site to switch the routing path of the first service. In another implementation, in a new network system architecture, for example, in a software-defined network (SDN), the routing path of the first service may be determined by using an SDN controller, and the path is switched by using a control protocol.

Optionally, a control device in the following embodiments may be a network management system and a host. The network management system may query the host about information such as board information, a line board status, and a routing path. Then the network management system determines the routing path of the first service based on the information returned by the host, and controls to perform operations such as routing path connection and switching operations. Alternatively, the control device may be a device integrating a function of a network management system and a function of a host, or may be an SDN controller, or may be a controller in a site, and the controller includes a controller in an optical subrack and a controller in an electrical subrack in the site.

An example in which a site receives a first service is used. The first service is blocked when the first service is a newly delivered service, or when a first line board that receives the first service is faulty, or when an external optical fiber of the site is faulty, or the like. Although a network has sufficient resources, the first service may still fail to be transmitted because a mapping wavelength of the first service is blocked on an original routing path.

The following uses an example in which an original routing path includes a first line board connected to a first local dimension. In the prior art, only when the first local dimension includes an idle-state line board and a wavelength occupied by the first local dimension does not include the mapping wavelength of the first service, a problem that the first service is blocked in the first local dimension can be resolved, and a solution thereof is as follows: If an initial wavelength is still used for the mapping wavelength of the first service, and the wavelength occupied by the first local dimension does not include the initial wavelength of the first service, the first service may be mapped into an optical signal of the initial wavelength by the idle-state line board in the first local dimension, and the optical signal is successfully transmitted in the first local dimension. Alternatively, if a rerouting wavelength is used for the mapping wavelength of the first service, and the wavelength occupied by the first local dimension does not include the rerouting wavelength of the first service, the first service may be mapped into an optical signal of the rerouting wavelength by the idle-state line board in the first local dimension, and the optical signal is successfully transmitted in the first local dimension. However, when the wavelength occupied by the first local dimension includes the mapping wavelength of the first service, even if the first local dimension includes an idle-state line board, the problem that the first service fails to be transmitted because the first service is blocked in the first local dimension cannot be resolved in the prior art. The following provides several cases in which the problem that the first service is blocked in the first local dimension cannot be resolved in the prior art.

Case 1: When the first service is a newly delivered service, the site receives the first service. If the mapping wavelength of the first service has been used for another service in the first local dimension, in other words, if the wavelength occupied by the first local dimension includes the mapping wavelength of the first service, the first service is blocked in the first local dimension. Consequently, the first service fails to be transmitted on the original routing path.

Case 2: When the first line board that receives the first service is faulty, if the wavelength occupied by the first local dimension includes the mapping wavelength of the first service, for example, if the first service is still transmitted in the first local dimension by using an initial wavelength and the initial wavelength of the first service has been used for another service in the first local dimension, for another example, if the first service is transmitted in the first local dimension by using an optical signal of a rerouting wavelength and the wavelength occupied by the first local dimension includes the rerouting wavelength of the first service, regardless of whether the first local dimension includes an idle-state line board, the first service is blocked in the first local dimension. Consequently, the first service fails to be transmitted on the original routing path.

Case 3: When an external optical fiber connected to a line dimension connected to the first local dimension on the original routing path is faulty and consequently the first service cannot be transmitted over the faulty optical fiber by using an initial wavelength, the first service is transmitted in the first local dimension by using an optical signal of a rerouting wavelength, and the wavelength occupied by the first local dimension includes the rerouting wavelength of the first service. Consequently, the first service fails to be transmitted on the original routing path.

In the embodiments of this application, the mapping wavelength of the first service is a wavelength used for mapping the first service into an optical signal for transmission. For example, if the mapping wavelength of the first service is $\lambda 1$, the first service is transmitted to the first line board, the first line board maps the first service into an optical signal of the wavelength $\lambda 1$, and the optical signal is transmitted in the first local dimension. The mapping wavelength of the first service is determined based on a specific routing path. For example, the mapping wavelength of the first service on the original routing path is $\lambda 1$, and the wavelength occupied by the first local dimension on the original routing path is $\lambda 1$. However, the wavelength occupied by the first local dimension does not include a wavelength $\lambda 3$. Therefore, the first service may be transmitted in the first local dimension by using an optical signal of the wavelength $\lambda 3$. In this case, the mapping wavelength of the first service is the wavelength λ3. The wavelength λ1 may also be referred to as an initial wavelength, and the wavelength λ3 may also be referred to as a rerouting wavelength.

To resolve the problem that the mapping wavelength of the first service is blocked on the original routing path because the first local dimension occupies the mapping wavelength of the first service, the embodiments of this application provide a service processing method. The first service is converted into another local dimension that is different from the first local dimension and whose occupied wavelength does not include the mapping wavelength of the first service, so as to successfully transmit the first service.

The following describes in detail the service processing method provided in this application with reference to specific embodiments.

In the embodiments of this application, the automatically switched network includes a plurality of sites, and each site includes a plurality of local dimensions. The service processing method provided in the embodiments of this application is applicable to a scenario in which a service received by any local dimension in the site shown in FIG. 3 is blocked. In the embodiments of this application, a process of implementing the service processing method is described by using the first local dimension, a second local dimension, and a third local dimension as an example. The first local dimension, the second local dimension, and the third local dimension are merely described to distinguishing between local dimensions involved in the service processing process. The method provided in the present invention is not merely limited to the foregoing three local dimensions. Each local dimension also includes a plurality of line boards. In the embodiments of this application, the "first line board", a "second line board", and a "third line board" are merely used for distinguishing, and have no limitation meaning.

Figure 4:
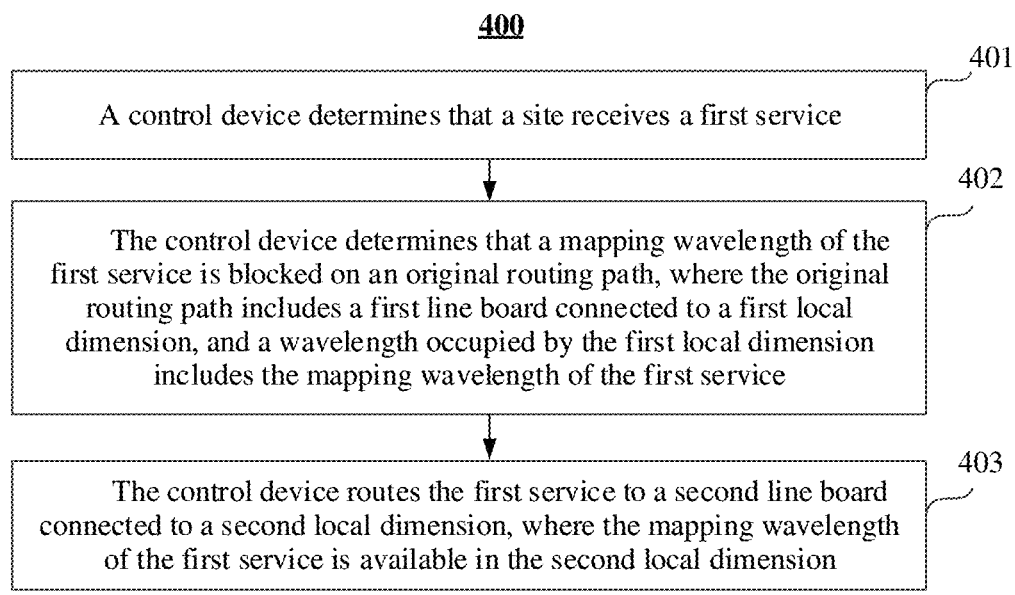
FIG. 4 is a schematic flowchart of a service processing method 400 according to an embodiment of this application.

FIG. 4 is an example of a service processing method 400 according to an embodiment of this application. The method 400 includes the following steps:

Step 401: A control device determines that a site receives a first service.

Step 402: The control device determines that a mapping wavelength of the first service is blocked on an original routing path, where the original routing path includes a first line board connected to a first local dimension, and a wavelength occupied by the first local dimension includes the mapping wavelength of the first service.

Step 403: The control device routes the first service to a second line board connected to a second local dimension, where the mapping wavelength of the first service is available in the second local dimension.

In step 403, for example, if the mapping wavelength of the first service is λ1, and the mapping wavelength of the first service is available in the second local dimension, it can be understood that a wavelength occupied by the second local dimension does not include λ1, or it can be understood that no service other than the first service is transmitted in the second local dimension by using λ1.

Optionally, in step 403, the second line board is an idle-state line board in the second local dimension, or the second line board is a line board whose operating wavelength is not occupied by the first local dimension. For example, if the operating wavelength of the second line board is λ1, an electrical signal corresponding to the first service is mapped to an optical signal of the wavelength λ1 by the second line board.

It should be noted that, if a quantity of local dimensions included in the site is not less than a quantity of line dimensions included in the site, and all line boards configured in the site are evenly allocated in the local dimensions in the site, the second line board connected to the second local dimension usually exists. In other words, it is very likely to find the second line board to perform step 403. Therefore, the mapping wavelength of the first service is available in the second local dimension.

To further ensure that the first service is routed to the second line board in the second local dimension without affecting normal service transmission in the second local dimension, the first service may be routed to the second line board in the second local dimension in the following optional manners, for example, the following implementation A and implementation B.

In the implementation A, if the second line board is in an idle state, the first service is routed to the second line board in the second local dimension. Because the second line board is in an idle state, and the mapping wavelength of the first service is available in the second local dimension, the first service may be directly routed to the second line board and may be normally transmitted in the second local dimension, without affecting normal service transmission in the second local dimension.

In the implementation B, if the second line board is in a working state of processing a second service, the first service cannot be rerouted to the second line board. A solution is to reroute the second service to another line board, so that the second line board switches from a working state to an idle state, and therefore the idle-state second line board can receive the first service. Specifically, the second service processed by the second line board may be routed to a third line board connected to a third local dimension, and the first service may be routed to the second line board. A mapping wavelength of the second service is available in the third local dimension. The second line board is in an idle state after the second service is routed to the third line board, and then the first service is routed to the second line board. Therefore, the first service may be transmitted in the second local dimension without blocking and without affecting normal service transmission in the second local dimension.

In this embodiment, the site receives the first service. If the first service is transmitted from the first line board included in the original routing path, and the original routing path includes the first line board connected to the first local dimension, the first service is transmitted from the first line board to the first local dimension connected to the first line board. However, because the wavelength occupied by the first local dimension includes the mapping wavelength of the first service, in other words, because the mapping wavelength of the first service is unavailable in the first local dimension, the first service cannot be transmitted in the first local dimension, and the mapping wavelength of the first service is blocked on the original routing path. Consequently, the first service fails to be transmitted. In this embodiment of this application, to prevent the first service from failing to be transmitted, the first service is routed to the second line board connected to the second local dimension. Because the mapping wavelength of the first service is available in the second local dimension, the first service may be successfully transmitted in the second local dimension. This can resolve a problem that the service fails to be transmitted because the mapping wavelength of the first service is blocked on the original routing path in an existing site of a CD OXC structure.

Figure 5A:
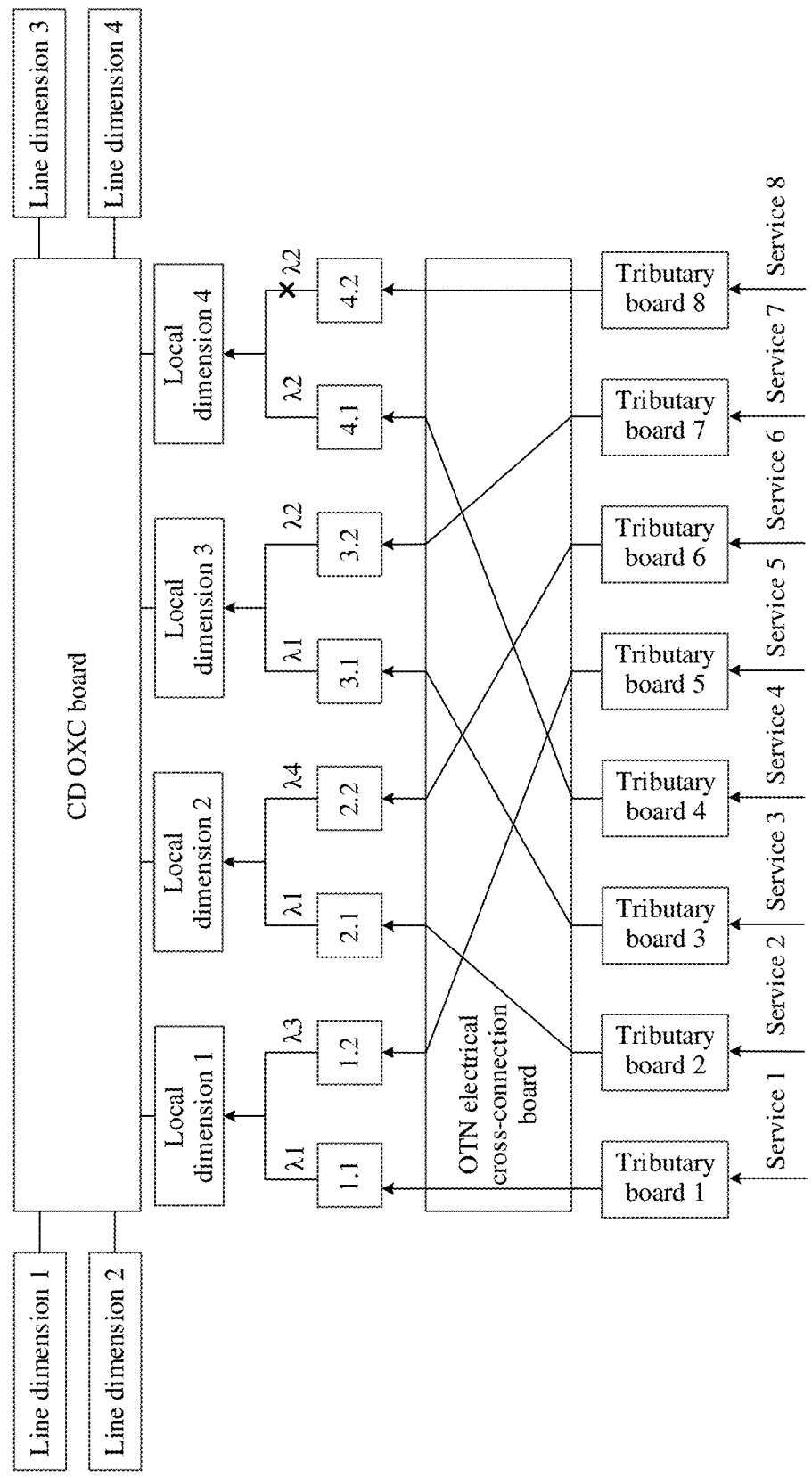
FIG. 5*a* is a first schematic diagram of a service path in a first implementation scenario according to an embodiment of this application.
Figure 6A:
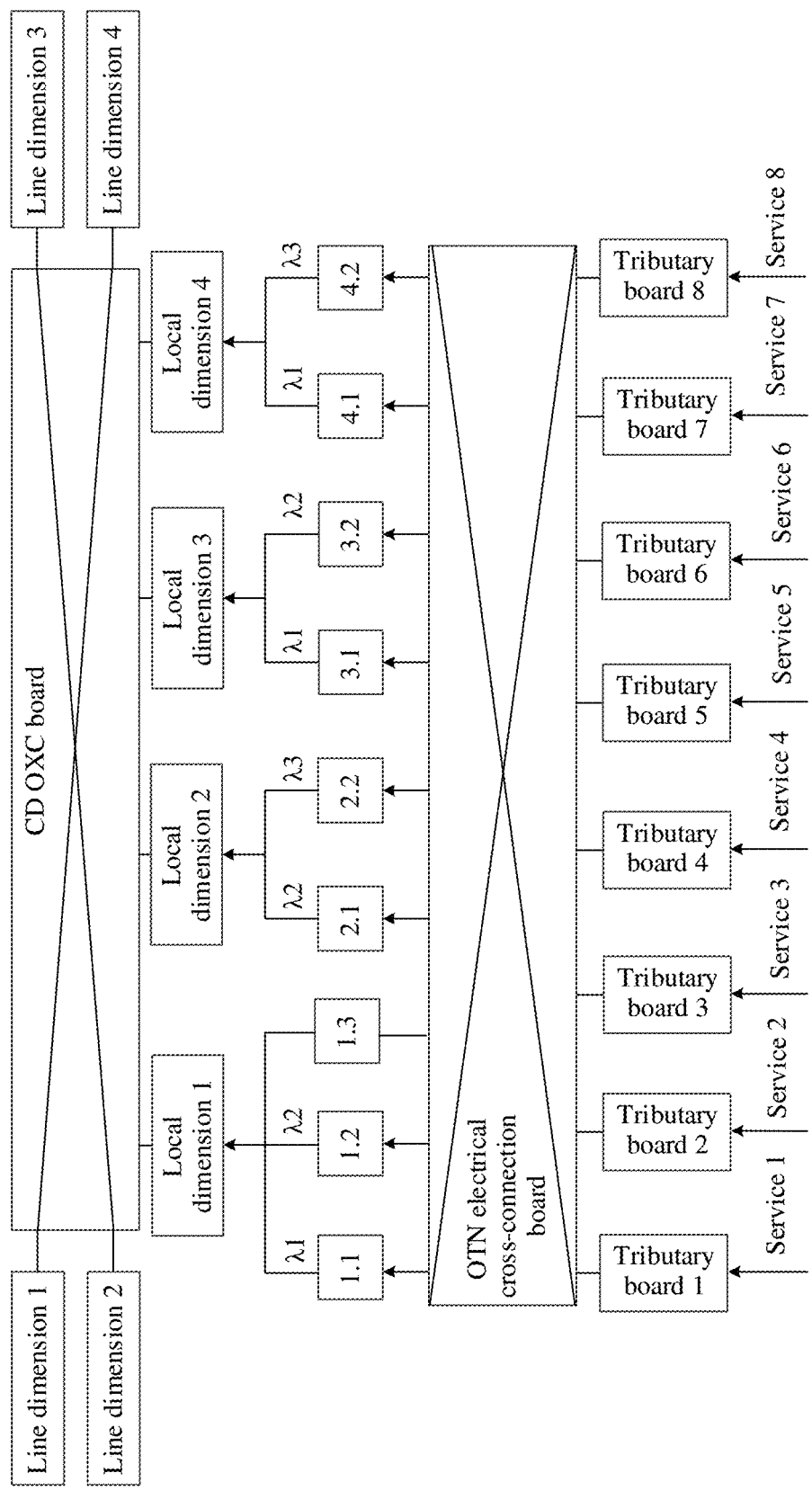
FIG. 6a is a first schematic diagram of a service path in a second implementation scenario according to an embodiment of this application.

In the implementation B, the third local dimension and the first local dimension may be a same local dimension. As shown in FIG. 5a, both the first local dimension and the third local dimension are a local dimension 4 in FIG. 5a. Alternatively, the third local dimension and the first local dimension may be two different local dimensions. As shown in FIG. 6a, the first local dimension is a local dimension 4 in FIG. 6a, and the third local dimension is a local dimension 1 in FIG. 6a.

It should be noted that, in the implementation B, if the third line board is in a working state, routing the first service to the second line board connected to the second local dimension can ensure normal transmission of the first service, but cannot ensure that the first service does not affect normal transmission of another service received by the site. For example, if the third line board is in a working state, the second service fails to be routed. Therefore, to ensure that rerouting of any service in the site does not affect normal transmission of another service received by the site, at least one idle-state line board may be configured in the site.

In this way, the second service may be routed to the idle-state line board, or the second service is routed to the third line board and a third service processed by the third line board is routed to the idle-state line board. Therefore, it can be ensured that the first service is routed to the second line board without affecting normal transmission of a service processed by any local dimension in the site other than the first local dimension.

According to the implementation B, when the second line board is processing the second service, an example in which a direction in which the second service is output from the second line board is a direction of the first line dimension is used. There are a plurality of specific manners for rerouting the second service to the third line board.

In an optional implementation that is an electrical-layer single-sending manner, the control device may adjust an operating wavelength of the third line board to the mapping wavelength corresponding to the second service, control the second service to be sent to the third line board, and adjust, to the direction of the first line dimension, a direction in which the second service is output from the third line board. Therefore, the second line board can be changed to an idle line board, so that the first service is rerouted to the second line board. However, a process from starting of rerouting of the second service to completion of the rerouting may cause interruption of the second service, and consequently normal transmission of the second service is affected.

To transmit the second service without interruption in a process of routing the second service to the third line board connected to the third local dimension, this application provides another optional implementation that is an electrical-layer dual-sending manner. Specifically, the control device may adjust an operating wavelength of the third line board to the mapping wavelength of the second service, and control the second service to be sent to the second line board and the third line board. A direction in which the second service is output from the second line board includes the first line dimension connected to the second local dimension. Specifically, an example in which a first tributary board receives the second service is used. The control device adjusts an OTN electrical cross-connect board to send the second service to the second line board and the third line board through electrical cross-connection, so that an electrical signal corresponding to the second service is sent to the two line boards through electronic-layer dual-sending. Either of the line boards receives the electrical signal corresponding to the second service, and converts the electrical signal into an optical signal.

Further, the third local dimension is controlled to connect to the first line dimension, and a direction in which the second service is output from the third line board includes the first line dimension connected to the third local dimension. For example, when the second local dimension is connected to the first line dimension and the second service is routed to the third line board, a CD OXC board is adjusted to connect the third local dimension and the first line dimension through optical cross-connection, so as to implement optical-layer dual-receiving of an optical signal corresponding to the second service. Then the first line dimension is controlled to receive a signal of the second service sent from the third line board, and sending of the second service to the second line board is cancelled.

In this implementation, the second service originally sent only to the second line board may be first sent to both the second line board and the third line board, and the third local dimension connected to the third line board is controlled to connect to the first line dimension. In other words, currently, the second local dimension is connected to the first line dimension, and the third local dimension is also connected to the first line dimension. Therefore, the first line dimension at the optical layer can receive a signal of the second service transmitted from the second local dimension, and can also receive a signal of the second service transmitted from the third local dimension. Then the first line dimension is controlled to receive the signal of the second service sent from the third line board, and the sending of the second service to the second line board is cancelled. The first line dimension receives only the second service that is transmitted from the third line board to the third local dimension and that is transmitted from the third local dimension. It can be learned that, before the first line dimension receives the second service transmitted from the third local dimension, the first line dimension may still receive the second service transmitted by the second local dimension, so that the second service can be transmitted to the first line dimension without interruption.

Further, the first line dimension is controlled to receive the signal of the second service sent from the third line board, and the sending of the second service to the second line board is cancelled. Therefore, the second line board can be in an idle state, so that the first service can be routed to the idle-state second line board. In addition, the mapping wavelength of the first service is available in the second local dimension, so that the first service can be transmitted in the second local dimension without blocking.

In addition, compared with the electrical-layer single-sending manner, the foregoing electrical-layer dual-sending manner can ensure that the second service is not interrupted in a rerouting process, or an interruption time is much shorter than an interruption time in the electrical-layer single-sending manner, and has little impact on normal transmission of the second service.

In any one of the foregoing embodiments, the service processing method performed by the control device can be applied to a plurality of scenarios in which the mapping wavelength of the first service is blocked on the original routing path. The following specifically describes several implementation scenarios.

In any one of the implementation scenarios provided in the embodiments of this application, it is assumed that a preset quantity of line boards are configured in a site, and the line boards are allocated to local dimensions according to an average allocation principle. For example, a difference between quantities of line boards connected to any two local dimensions is a positive integer less than 2. For example, assuming that eight line boards and four local dimensions are configured in the site, it is set that each local dimension is connected to two line boards. For another example, assuming that nine line boards and four local dimensions are configured in the site, it is set that three local dimensions are connected to two line boards, and one local dimension is connected to three line boards.

When receiving services, tributary boards in the site sequentially send, according to the average allocation principle through cross-connection by using the OTN electrical cross-connect board, electrical signals corresponding to a plurality of received services to line boards connected to local dimensions.

In an example, referring to FIG. 5a, the site includes eight tributary boards: a tributary board 1, a tributary board 2, . . . , and a tributary board 8, and a line board number is x·y, where x is a number of a local dimension, and y is a location number of the line board in all line boards connected to the local dimension connected to the line board. For example, a line board number 1.2 represents the second line board connected to a local dimension 1. It should be noted that line boards in FIG. 5a and any one of the following schematic diagrams (FIG. 5b to FIG. 5d, FIG. 6a to FIG. 6c, and FIG. 7a to FIG. 7d) are shown by using only line board numbers as examples.

It is assumed that the site sequentially receives eight services, and each tributary board receives one service. The tributary board 1 receives an electrical signal corresponding to a service 1 and sends the electrical signal to a line board 1.1 through cross-connection. The tributary board 2 receives an electrical signal corresponding to a service 2 and sends the electrical signal to a line board 2.1 through cross-connection. The tributary board 3 receives an electrical signal corresponding to a service 3 and sends the electrical signal to a line board 30.1 through cross-connection. The tributary board 4 receives an electrical signal corresponding to a service 4 and sends the electrical signal to a line board 40.1 through cross-connection. The tributary board 5 receives an electrical signal corresponding to a service 5 and sends the electrical signal to the line board 1.2 through cross-connection. The tributary board 6 receives an electrical signal corresponding to a service 6 and sends the electrical signal to a line board 2.2 through cross-connection. The tributary board 7 receives an electrical signal corresponding to a service 7 and sends the electrical signal to a line board 30.2 through cross-connection. The tributary board 8 receives an electrical signal corresponding to a service 8 and sends the electrical signal to a line board 40.2 through cross-connection. A tributary board in any one of the following examples (as shown in FIG. 5b to FIG. 5d, FIG. 6a to FIG. 6c, and FIG. 7a to FIG. 7d) receives a service by using the manner in this example.

First Implementation Scenario

If the control device determines, before the first service is transmitted to the first line board, that the mapping wavelength of the first service is blocked on the original routing path, the control device determines that the first service needs to be routed to the second line board in the second local dimension. For example, if the first service is a service newly delivered to the site, and the first service cannot be transmitted in the first local dimension, the first service needs to be routed to the second line board in the second local dimension.

In an example a1, if the second line board is in an idle state, the first service is directly routed from the first line board to the second line board connected to the second local dimension.

In an example a2, if the second line board connected to the second local dimension is a line board that is in a working state and that processes the second service, as shown in FIG. 5a, the third local dimension is the first local dimension, and the third line board is the first line board. Specifically, the wavelength occupied by the first local dimension does not include the mapping wavelength corresponding to the second service, and the second service received by the second line board may be routed to the first line board connected to the first local dimension, so that the second line board is in an idle state, and the first service is routed to the second line board.

Referring to FIG. 5a, an optical signal corresponding to the service 1 and an optical signal corresponding to the service 5 are transmitted to the local dimension 1, an optical signal corresponding to the service 2 and an optical signal corresponding to the service 6 are transmitted to a local dimension 2, an optical signal corresponding to the service 3 and an optical signal corresponding to the service 7 are transmitted to a local dimension 3, and an optical signal corresponding to the service 4 is transmitted to a local dimension 4. A wavelength of the optical signal corresponding to the service 1 is $\lambda 1$, a wavelength of the optical signal corresponding to the service 5 is $\lambda 3$, a wavelength of the optical signal corresponding to the service 2 is $\lambda 1$, a wavelength of the optical signal corresponding to the service 6 is $\lambda 4$, a wavelength of the optical signal corresponding to the service 3 is $\lambda 1$, a wavelength of the optical signal corresponding to the service 7 is $\lambda 2$, and a wavelength of the optical signal corresponding to the service 4 is $\lambda 2$.

An example in which the first service is the service 8 in FIG. 5a, the first line board is the line board 40.2 in FIG. 5a, and the first local dimension is the local dimension 4 in FIG. 5a is used to describe the service processing method provided in the embodiments of this application.

When the tributary board 8 receives the newly delivered service 8, the original routing path determined by the control device is as follows: The service 8 is input to the line board 40.2, and the line board 40.2 outputs an optical signal of the wavelength $\lambda 2$ to the local dimension 4. Because the local dimension 4 occupies the wavelength $\lambda 2$, the service 8 is blocked in the local dimension 4, and consequently transmission of the service 8 is interrupted.

In this example, an example in which the control device includes a network management system and a host is used. The service processing method provided in this application includes the following process.

The network management system sends a request to the host, so as to request the host for information about the original routing path of the service 8 and a wavelength occupied by each local dimension and line dimension.

The network management system performs the following operations based on the information returned by the host:

The network management system finds, from the local dimension 1, the local dimension 2, and the local dimension 3, a local dimension whose occupied wavelength does not include $\lambda 2$. As shown in FIG. 5a, it may be determined that the local dimension 1 and the local dimension 2 do not occupy the wavelength $\lambda 2$. Therefore, the service 8 can be routed to the local dimension 1 or the local dimension 2.

An example in which the service 8 is routed to the local dimension 1 is used. A wavelength that is not occupied by the local dimension 4 is determined from the wavelength $\lambda 1$ and the wavelength $\lambda 3$ occupied by the local dimension 1. In other words, the wavelength $\lambda 1$ and the wavelength $\lambda 3$ are determined, and respectively correspond to the service 1 and the service 5. Therefore, the service 1 or the service 5 may be routed to the line board 40.2, so that an idle-state line board in the local dimension 1 is vacated to receive the service 8. An example in which the service 1 is routed to the line board 40.2 is used. The network management system determines a rerouting path of the service 8 based on the information returned by the host, routes the service 1 to the line board 4.2, and routes the service 8 to the line board 1.1.

Figure 5B:
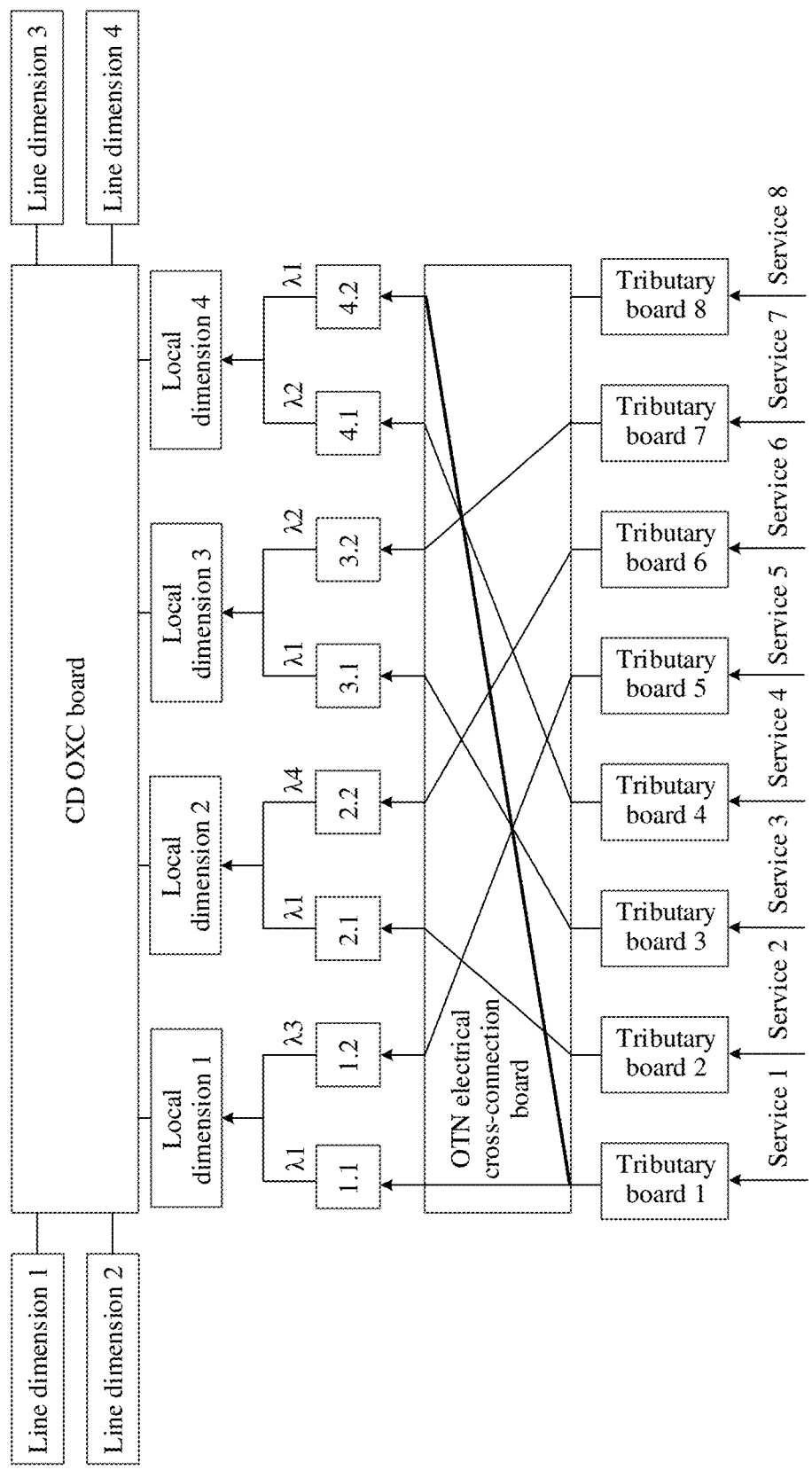
FIG. 5*b* is a second schematic diagram of a service path in a first implementation scenario according to an embodiment of this application.
Figure 5C:
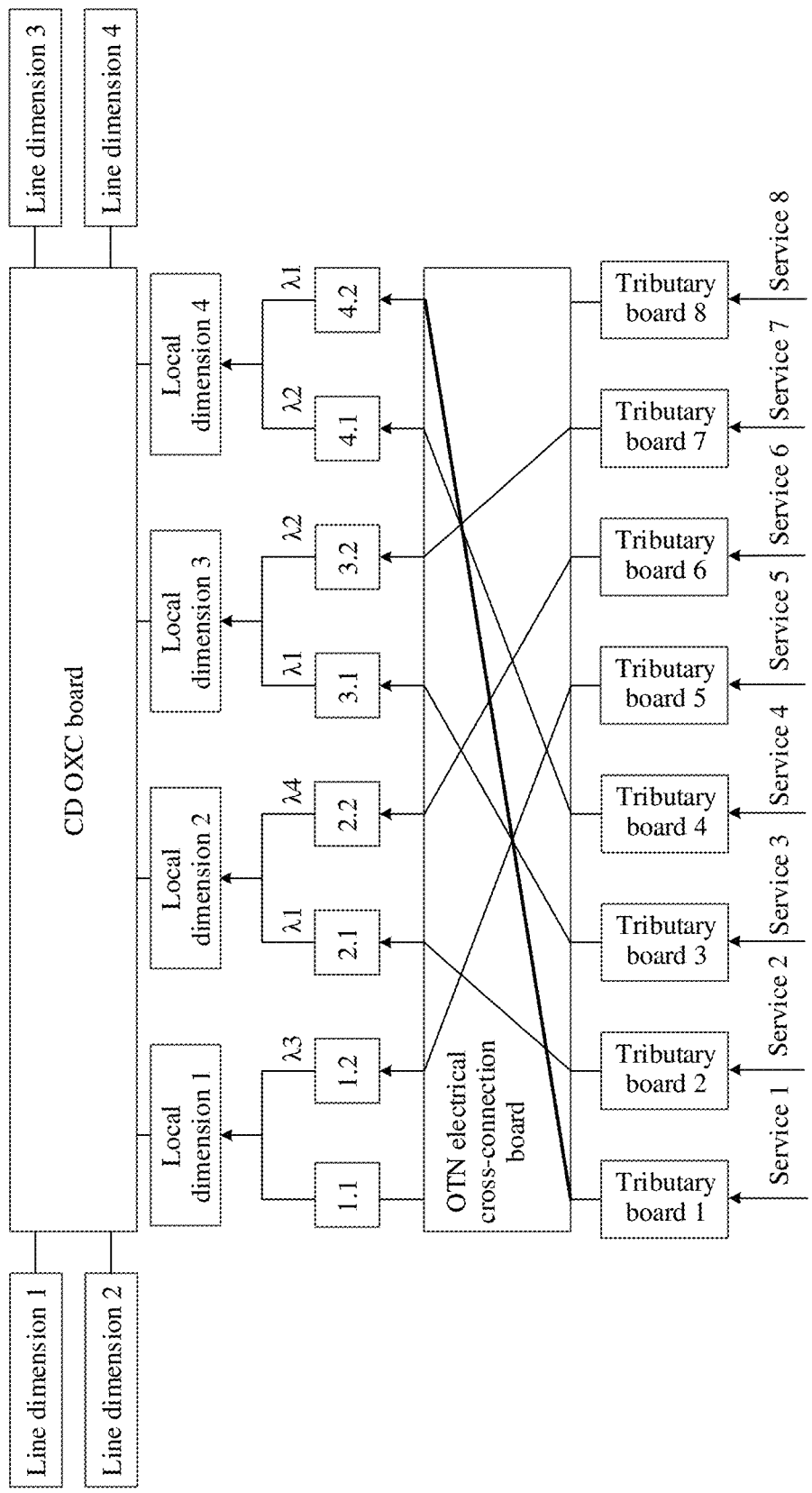
FIG. 5c is a third schematic diagram of a service path in a first implementation scenario according to an embodiment of this application.

Referring to FIG. 5*b*, the OTN electrical cross-connection board is controlled to send the electrical signal corresponding to the service 1 received by the tributary board 1 to both the line board 1.1 and the line board 40.2. The line board 1.1 maps the electrical signal corresponding to the service 1 into an optical signal of the wavelength λ1, and outputs the optical signal to the local dimension 1. The line board 40.2 maps the electrical signal corresponding to the service 1 into an optical signal of the wavelength λ1, and outputs the optical signal to the local dimension 4.

It is assumed that the optical signal of the wavelength λ1 corresponding to the service 1 is sent from the local dimension 1 to a line dimension 1 through optical cross-connection, and the local dimension 4 connected to the line board 40.2 is controlled to connect to the line dimension 1 through optical cross-connection. In this case, the line dimension 1 receives two optical signals corresponding to the service 1. The line dimension 1 is controlled to convert the optical signal that is received by the line dimension 1 from the local dimension 1 into a signal that is received by the line dimension 1 from the local dimension 4, and the OTN electrical cross-connect board is controlled to cancel sending of the electrical signal corresponding to the service 1 to the line board 1.1. In this way, referring to FIG. 5*c*, the line board 1.1 is in an idle state.

Figure 5D:
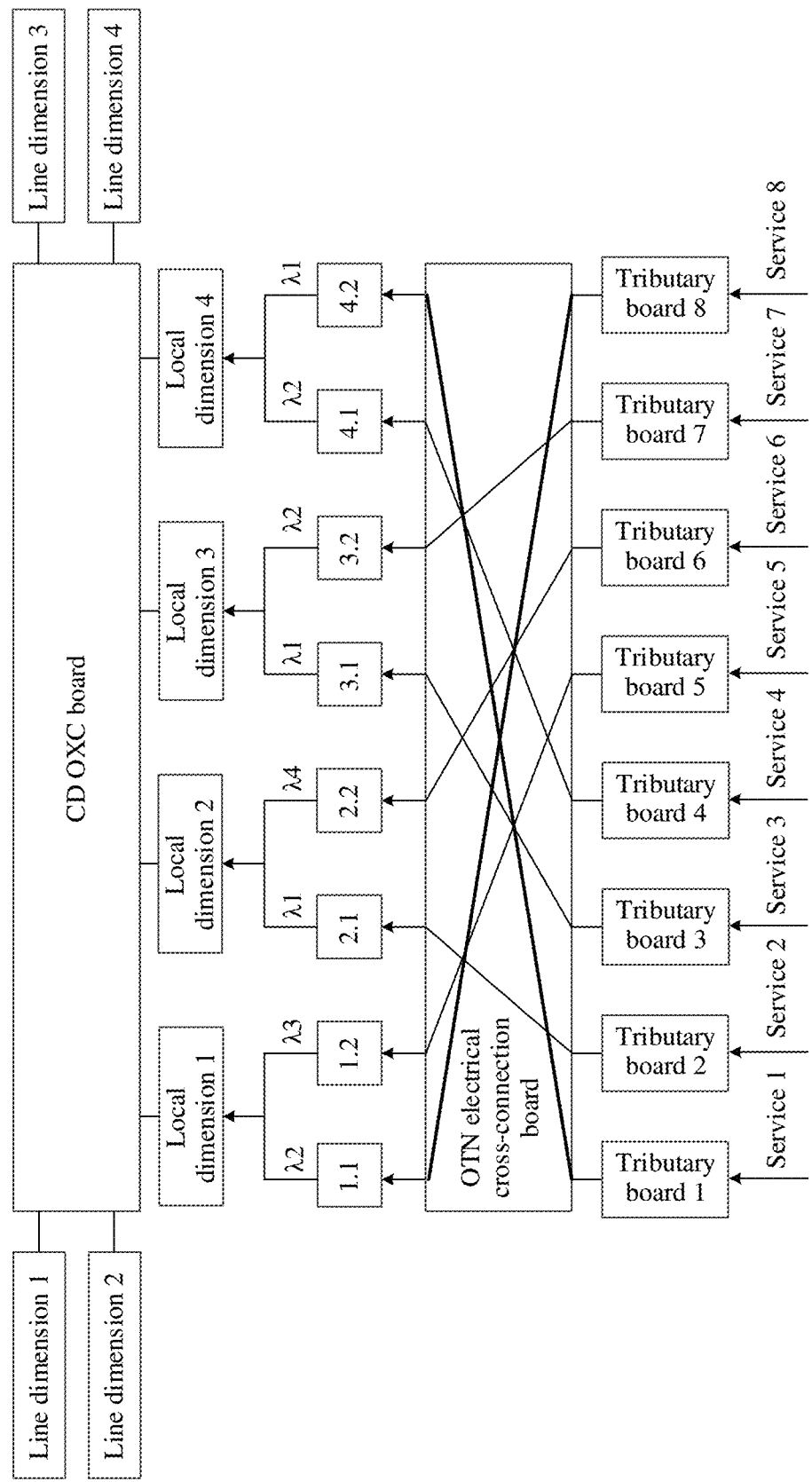
FIG. 5d is a fourth schematic diagram of a service path in a first implementation scenario according to an embodiment of this application.

The OTN electrical cross-connect board is controlled to send the electrical signal corresponding to the service 8 received by the tributary board 8 to the line board 1.1 through cross-connection. Referring to FIG. 5*d*, the line board 1.1 maps the received electrical signal corresponding to the service 8 into an optical signal of the wavelength λ2, and outputs the optical signal to the local dimension 1.

In the example a2, when the tributary board 8 in the site receives the newly delivered service 8, a mapping wavelength λ2 of the service 8 is occupied by the local dimension 4, and the service 8 is routed to the local dimension 1 whose occupied wavelength does not include λ2. In this way, it can be ensured that the service 8 can still be successfully transmitted in the local dimension 1 when the wavelength λ2 is occupied by the local dimension 4.

Second Implementation Scenario

If the control device determines that the first line board connected to the first local dimension is faulty, the control device determines that the mapping wavelength of the first service is blocked on the original routing path. In the prior art, when the first line board that receives the first service is faulty, if line boards connected to the first local dimension include an idle-state line board, the first service may be routed to the idle-state line board connected to the first local dimension. If the line boards connected to the first local dimension include no idle-state line board, the first service is interrupted. In this scenario, the control device in this embodiment of this application first determines whether the site includes the second local dimension, in other words, whether the site includes a local dimension whose occupied wavelength does not include the mapping wavelength of the first service.

In an optional manner, if the site includes the second local dimension, in this embodiment of this application, the following describes two cases of performing service processing for whether the second local dimension is connected to an idle-state line board. Referring to FIG. 6*a*, the site includes nine line boards, and a line board 1.3 connected to a local dimension 1 is an idle-state line board.

Case 1: The second local dimension is connected to an idle-state line board.

Figure 6B:
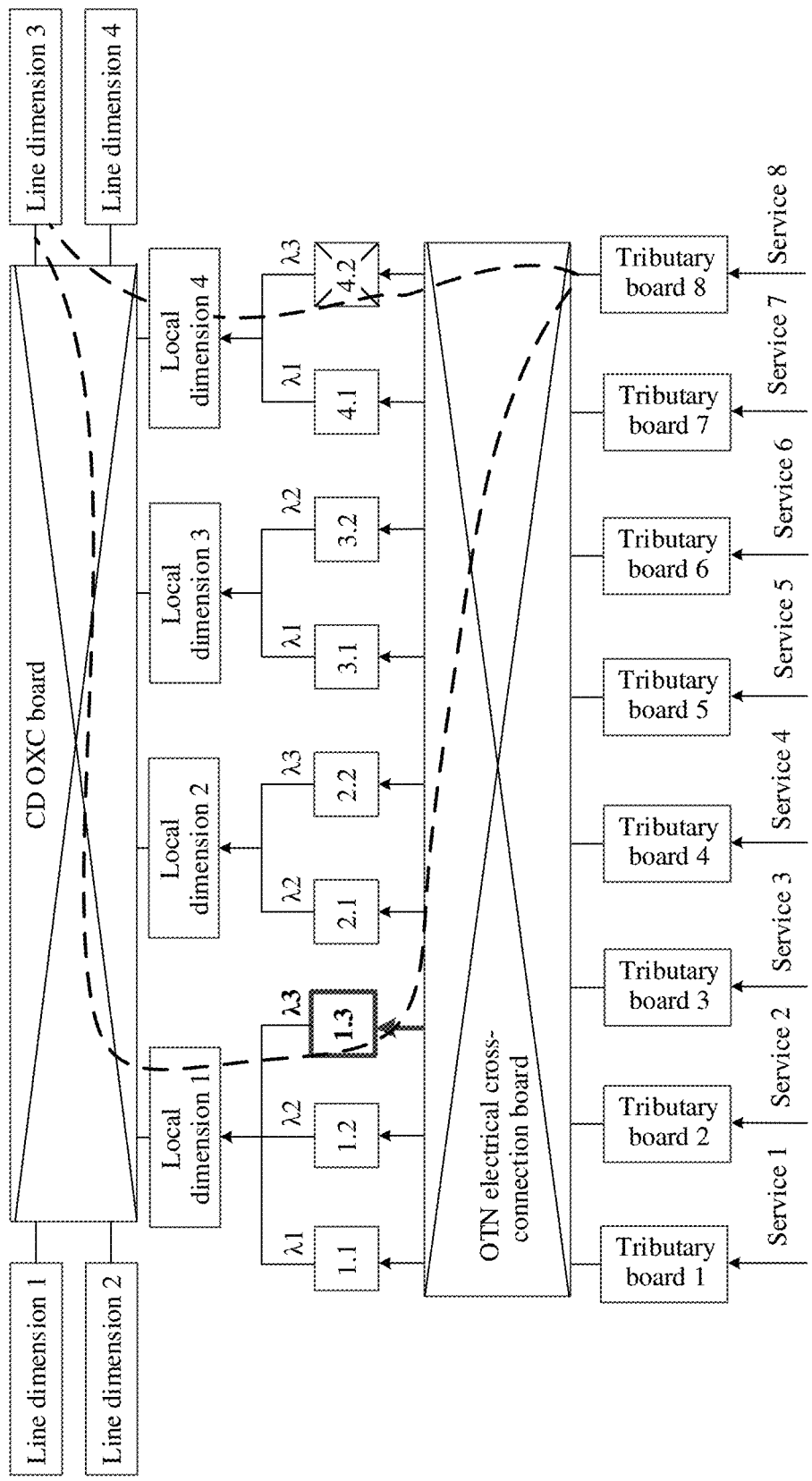
FIG. 6b is a second schematic diagram of a service path in a second implementation scenario according to an embodiment of this application.

In an example b1, referring to FIG. 6*a* and FIG. 6*b*, an example in which the first service is a service 8 in FIG. 6*a* and the first line board is a line board 40.2 is used. It is assumed that the line board 40.2 is faulty, an operating wavelength of the line board 40.2 is λ3, and the service 8 received by the line board 40.2 is interrupted.

A local dimension whose occupied wavelength does not include λ3 is determined from a local dimension 1, a local dimension 2, and a local dimension 3. In other words, the local dimension 1 and the local dimension 3 in FIG. 6*a* are determined.

If the service 8 is routed to the idle-state line board 1.1 in the local dimension 1, referring to FIG. 6*b*, a specific routing process is as follows: An operating wavelength of the line board 1.1 is adjusted to λ3, and the service 8 received by the tributary board 8 is sent to the line board 1.3 through cross-connection by using the OTN electrical cross-connect board.

If the service 8 is routed to the local dimension 3, because the local dimension 3 includes no idle-state line board, to ensure that the service 8 is routed to the local dimension 3 without affecting normal transmission of another service received by the local dimension 3 in the site, a feasible manner is as follows: Because the line board 1.3 connected to the local dimension 1 is in an idle state, a service 6 of the wavelength λ3 that is received by a line board 2.2 in the local dimension 2 may be routed to the line board 1.3, so that the line board 2.2 is in an idle state. A service of a wavelength λ1 that is received by a line board 30.1 connected to the local dimension 3 is routed to the line board 2.2, so that the line board 30.1 is in an idle state. Then the service 8 of the wavelength λ3 is routed to the idle-state line board 30.1. In this way, when the line board 40.2 is faulty, the service 8 received by the line board 40.2 can be routed to the line board 30.1 for normal transmission, without affecting normal transmission of another service received by the site.

Case 2: The line boards connected to the second local dimension include no idle-state line board.

Figure 6C:
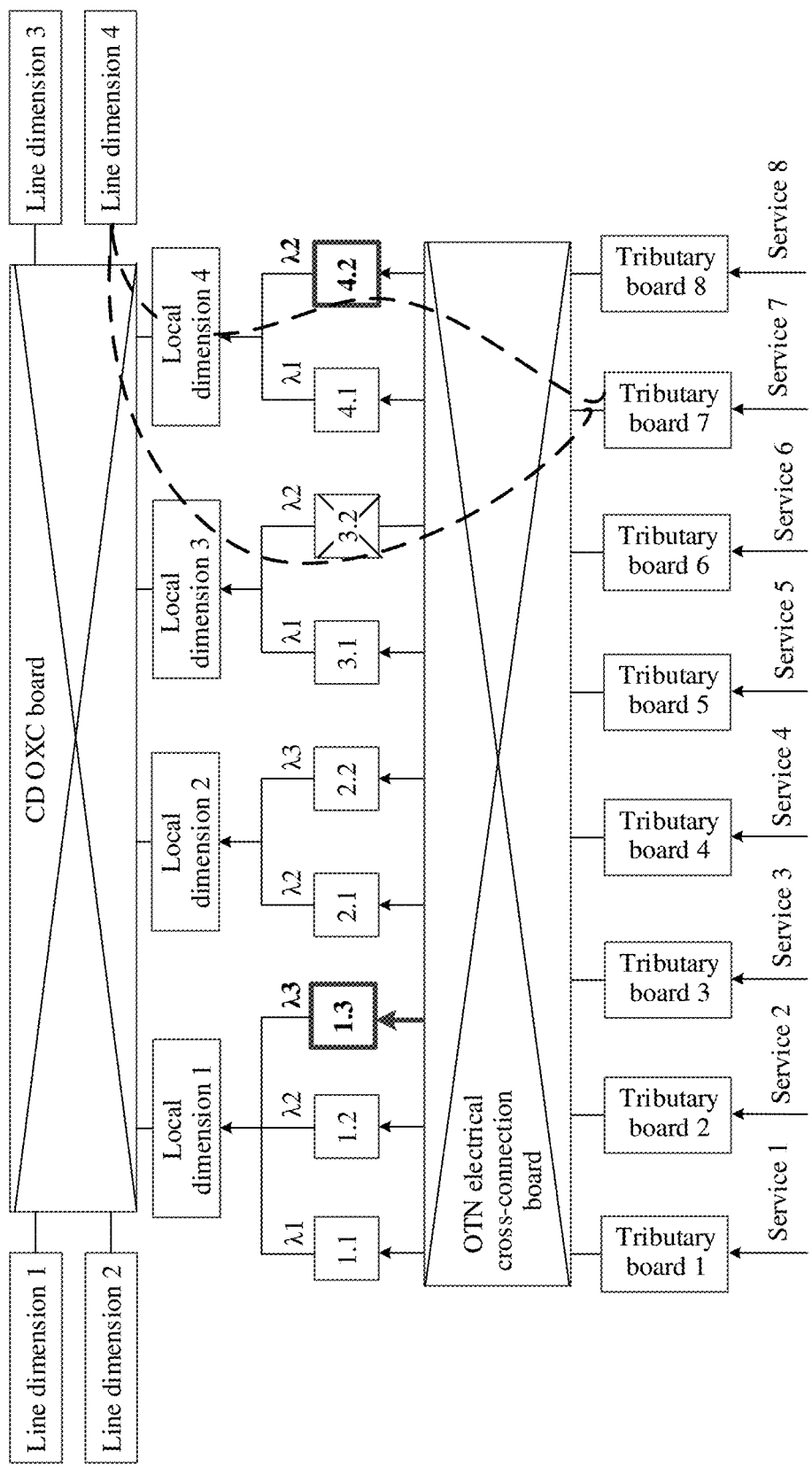
FIG. 6c is a third schematic diagram of a service path in a second implementation scenario according to an embodiment of this application.

In an example b2, referring to FIG. 6*a* and FIG. 6*c*, an example in which the first service is a service 7 in FIG. 6*a* and FIG. 6*c* and the first line board is a line board 30.2 is used. It is assumed that the line board 30.2 is faulty, an operating wavelength of the line board 30.2 is λ2, and the service 7 received by the line board 30.2 is interrupted.

The control device determines, from a local dimension 1, a local dimension 2, and a local dimension 4, a local dimension whose occupied wavelength does not include λ2, for example, a local dimension 4 shown in FIG. 6*a* and FIG. 6*c*. However, the local dimension 4 includes no idle-state line board. The local dimension 1 shown in FIG. 6*a* and FIG. 6*c* includes an idle-state line board 1.3, and a wavelength occupied by the local dimension 1 does not include λ3. Therefore, referring to FIG. 6*c*, a service 8 received by a line board 40.2 connected to the local dimension 4 may be routed to the idle-state line board 1.3, and the service 7 received by the faulty line board 30.2 is routed to the line board 40.2.

The control device performs a specific rerouting process. A manner of routing the service 8 received by the line board 40.2 to the line board 1.3 through electronic-layer dual-sending and optical-layer dual-receiving is similar to the example a2 in the first implementation scenario, and details are not described herein again. Finally, the service 7 is routed from the faulty line board 30.2 to the line board 40.2. The line board 40.2 maps the service 7 into an optical signal of the wavelength λ2, and outputs the optical signal to the local dimension 4. The local dimension 4 sends the optical signal to a line dimension 4 through cross-connection by using the CD OXC board.

In another optional manner, if the site includes no second local dimension, assuming that an operating wavelength of a faulty line board is λ1, that the site includes no second local dimension means that each local dimension in the site occupies the wavelength λ1.

In an example b3, for example, if an initial wavelength of the first service is λ1, the first service may be routed to another local dimension by using a rerouting wavelength. For example, if the site includes a fourth local dimension whose occupied wavelength does not include λ4, the first service may be routed to the fourth local dimension by using the rerouting wavelength λ4. A specific routing process is similar to the first service routing process in the foregoing first implementation scenario, and details are not described herein again.

Third Implementation Scenario

If the control device determines that an optical fiber connected to a line dimension connected to the first local dimension is faulty, the control device determines that the mapping wavelength of the first service is blocked on the original routing path. In an example, referring to FIG. 7a, a process in which a tributary board 3 receives a service 3 and the service 3 is transmitted on the original routing path is as follows: The service 3 is sent from the tributary board 3 to a line board 30.1 through cross-connection by using an OTN electrical cross-connect board, the service 3 is mapped into an optical signal of a wavelength λ1, and then the optical signal is output to a local dimension 3. The local dimension outputs the optical signal to a line dimension 4, and the line dimension 4 outputs the optical signal to another site over an optical fiber connected to the line dimension 4.

Assuming that the optical fiber connected to the line dimension 4 is faulty, the service 3 received by the line board 30.1 is blocked.

The following describes several possible examples of the service processing method provided in this embodiment of this application.

In an example c1, an example in which the first service is the service 3 and the first line board is the line board 30.1 is used. The mapping wavelength of the first service remains unchanged, and is still an initial wavelength λ1. A location of an add tributary/a drop tributary OTN of the first service remains unchanged, and a line dimension direction is changed. To be specific, the first service is still input into the local dimension 3 by using the line board 30.1, the operating wavelength λ1 of the line board 30.1 remains unchanged, and a direction of a line dimension in which the first service is located is adjusted to a rerouting line dimension. For example, if the rerouting line dimension is the line dimension 3 and the wavelength occupied by the line dimension 3 does not include λ1, the CD OXC board may be adjusted to cross-connect the local dimension 3 and the line dimension 3. In this way, the first service can still be normally transmitted by using an optical signal of a wavelength λ1 over an optical fiber connected to the line dimension 3.

In an example c2, an example in which the first service is the service 3 is used. The mapping wavelength of the first service changes, an original operating wavelength of the line board 30.1 is λ1, and the operating wavelength of the line board 30.1 is adjusted to λ3. In other words, the first service is transmitted in the site by using an optical signal of the rerouting wavelength λ3. Because the local dimension 3 does not occupy the wavelength λ3, if a wavelength occupied by the line dimension 4 does not include λ3, after the first service is mapped into the optical signal of the wavelength λ3, the first service is still transmitted to the line dimension 4 through cross-connection by using the local dimension 3. If the line dimension 4 occupies the wavelength λ3, the CD OXC board may be adjusted, so that the local dimension 3 is cross-connected to a line dimension that does not occupy the wavelength λ3. Therefore, after the first service is mapped into the optical signal of the wavelength λ3, through cross-connection by using the local dimension 3, the optical signal is transmitted to the line dimension that does not occupy the wavelength λ3.

Figure 7A:
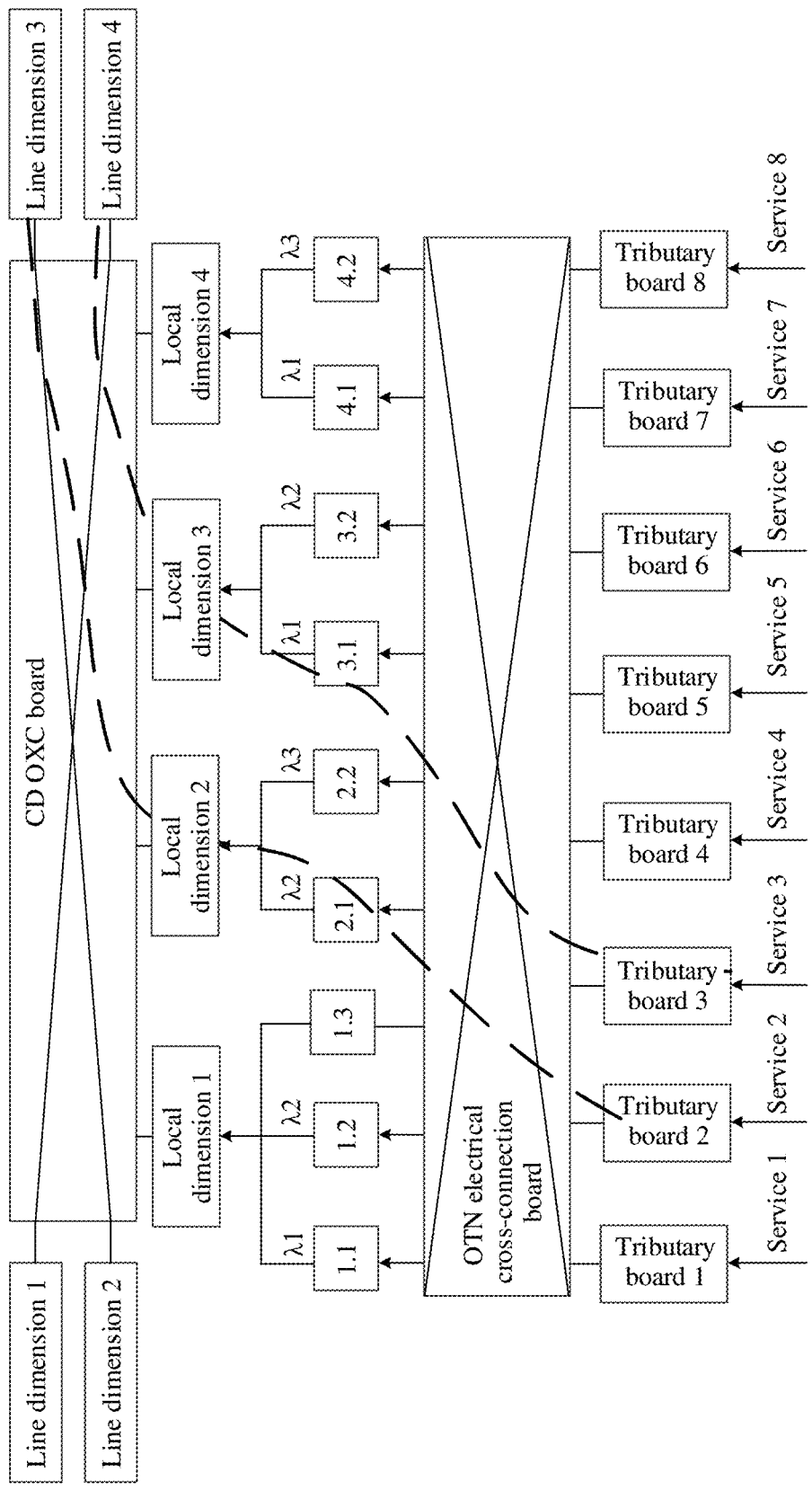
FIG. 7a is a first schematic diagram of a service path in a third implementation scenario according to an embodiment of this application.

In the foregoing example c1 and example c2, referring to FIG. 7a, if it is determined, based on each line dimension in the site and a situation of the wavelength occupied by the local dimension 3, that the service 3 needs to be transmitted in the site by using the rerouting wavelength λ2, but the local dimension 3 occupies the rerouting wavelength λ2, the service 3 is blocked in the local dimension 3. The prior art cannot resolve a problem that the service 3 is blocked and consequently is interrupted in this scenario.

To resolve the problem that the first service (for example, the service 3 in the example c2) is blocked in the first local dimension by using a rerouting wavelength and consequently is interrupted in this scenario, the service processing method provided in this embodiment of this application includes: routing the first service, and determining whether the site includes a second local dimension whose occupied wavelength does not include the rerouting wavelength of the first service.

In an example c3, an example in which the first service is the service 2 is used. It is assumed that the second local dimension exists, and the second local dimension includes an idle-state line board.

In FIG. 7a, for example, an optical fiber connected to a line dimension 3 is faulty, and consequently a service 2 transmitted in the site by using a wavelength λ2 is blocked. Therefore, the service 2 needs to be rerouted by using a wavelength λ3. Because a local dimension 2 connected to a line board 2.1 that receives the service 2 occupies the wavelength λ3, the service 2 needs to be rerouted to another local dimension in the site other than the local dimension 2.

A local dimension whose occupied wavelength does not include the wavelength λ3 is determined from local dimensions included in the site, for example, a local dimension 1 in FIG. 7a. The local dimension 1 includes an idle-state line board 1.3.

Figure 7B:
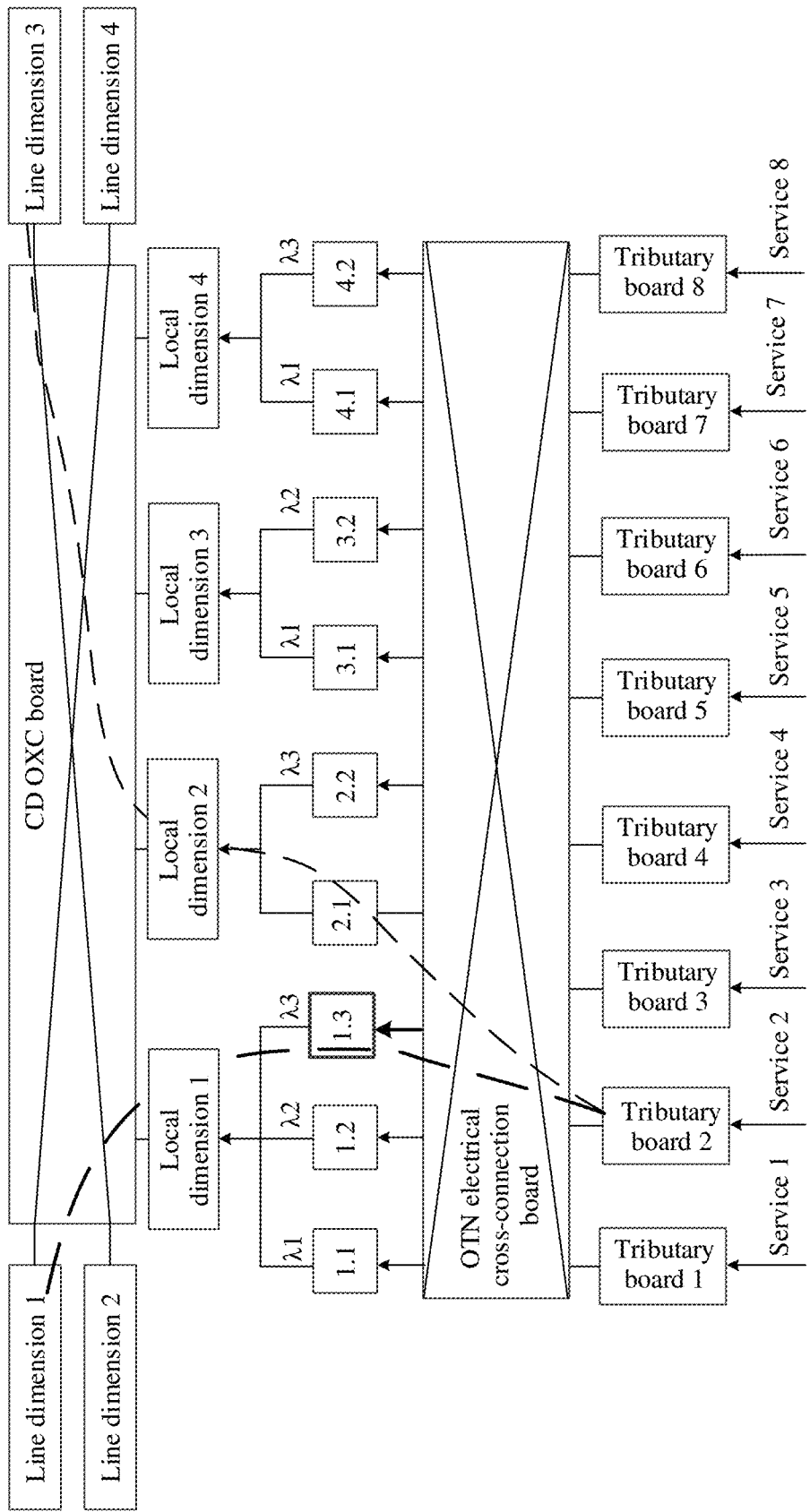
FIG. 7b is a second schematic diagram of a service path in a third implementation scenario according to an embodiment of this application.

Referring to FIG. 7b, an operating wavelength of an idle-state line board 1.3 is adjusted to a wavelength λ3, a service 2 received by a tributary board 2 is transmitted to the idle line board 1.3 through cross-connection, and a CD OXC board is adjusted to transmit the service 2 to a line dimension 1 through cross-connection by using the rerouting wavelength λ3.

In an example c4, an example in which the first service is the service 3 and the first local dimension is the local dimension 3 is used. It is assumed that the second local dimension exists, the second local dimension includes no idle-state line board, and another local dimension in the site includes an idle-state line board.

Referring to FIG. 7a, an example in which the service 3 is routed by using an optical signal of the wavelength λ2 is used. It is determined that the site includes a local dimension whose occupied wavelength does not include λ2, and therefore the local dimension 2 and a local dimension 4 are determined. Therefore, the service 3 can be routed to the local dimension 2 or the local dimension 4. An example in which the service 3 is routed to the local dimension 4 is used for description.

First, it is determined that the site shown in FIG. 7a includes the idle-state line board 1.3, and a wavelength occupied by the local dimension 1 connected to the line board 1.3 does not include the wavelength λ3. Therefore, the local dimension 1 may receive a service of the wavelength λ3.

Second, it is determined that an operating wavelength of a line board 40.2 in the local dimension 4 is λ3, and a wavelength occupied by the local dimension 4 does not include λ2. Therefore, a service received by the line board 40.2 may be routed to the idle-state line board 1.3 by using the wavelength λ3, and the service 3 received by the line board 30.1 may be routed to the line board 40.2 by using the wavelength λ2. For a specific rerouting process, refer to the rerouting process in FIG. 7c and FIG. 7d. Details are not described herein again.

Figure 7C:
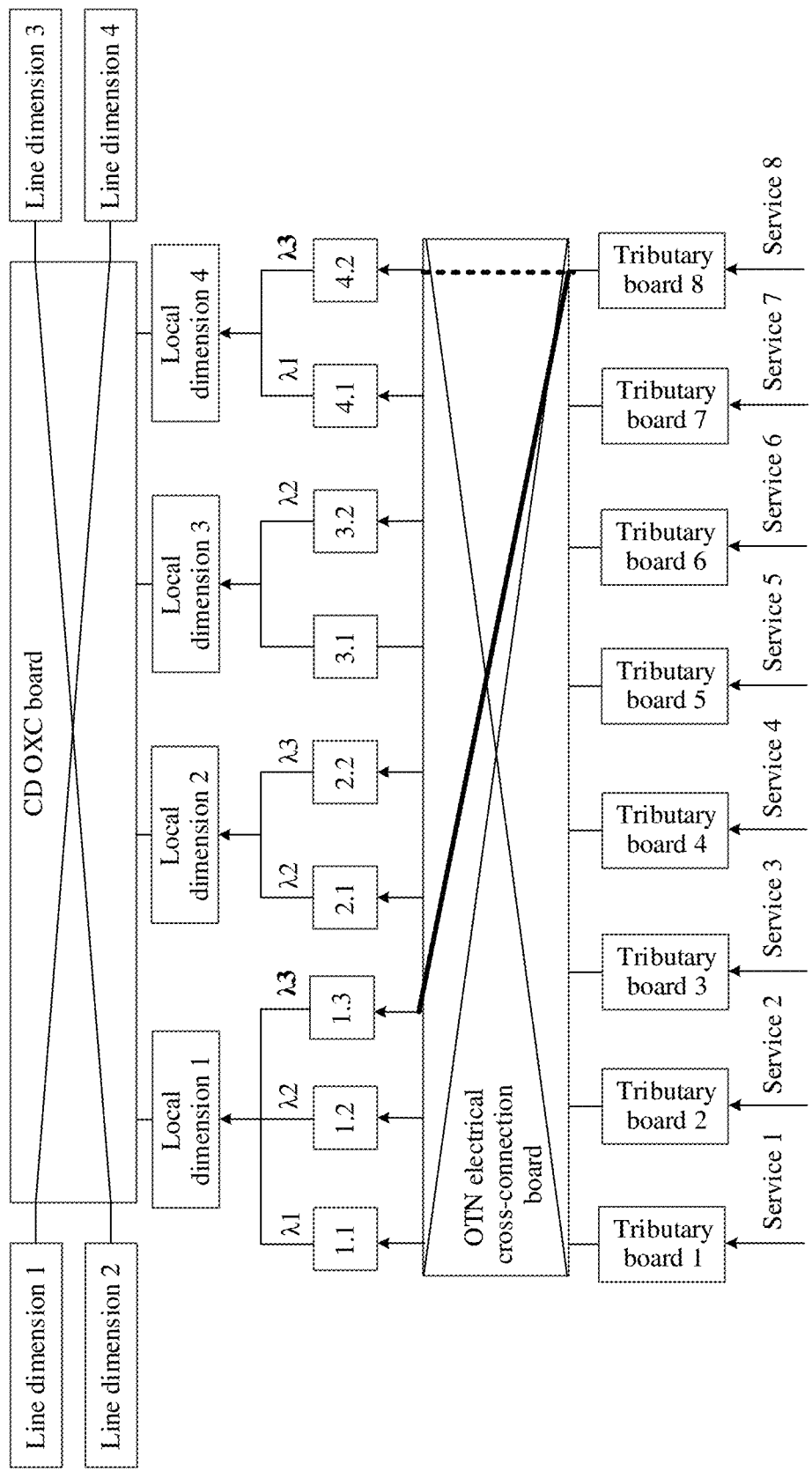
FIG. 7c is a third schematic diagram of a service path in a third implementation scenario according to an embodiment of this application.

As shown in FIG. 7c, an operating wavelength of the line board 30.1 is adjusted to λ3, and an OTN electrical cross-connect board is adjusted, so that a service 8 of a tributary board 8 is sent to both the line board 1.3 and the line board 40.2. The service 8 is output by the line board 1.3 or the line board 4.2 as an optical signal of the wavelength λ3. Then, through cross-connection by using a CD OXC board, the optical signal is transmitted to a line dimension connected to the local dimension 4. Subsequently, sending of the service 8 to the line board 40.2 by using the tributary board 8 is cancelled. In this case, the line board 40.2 is in an idle state.

Figure 7D:
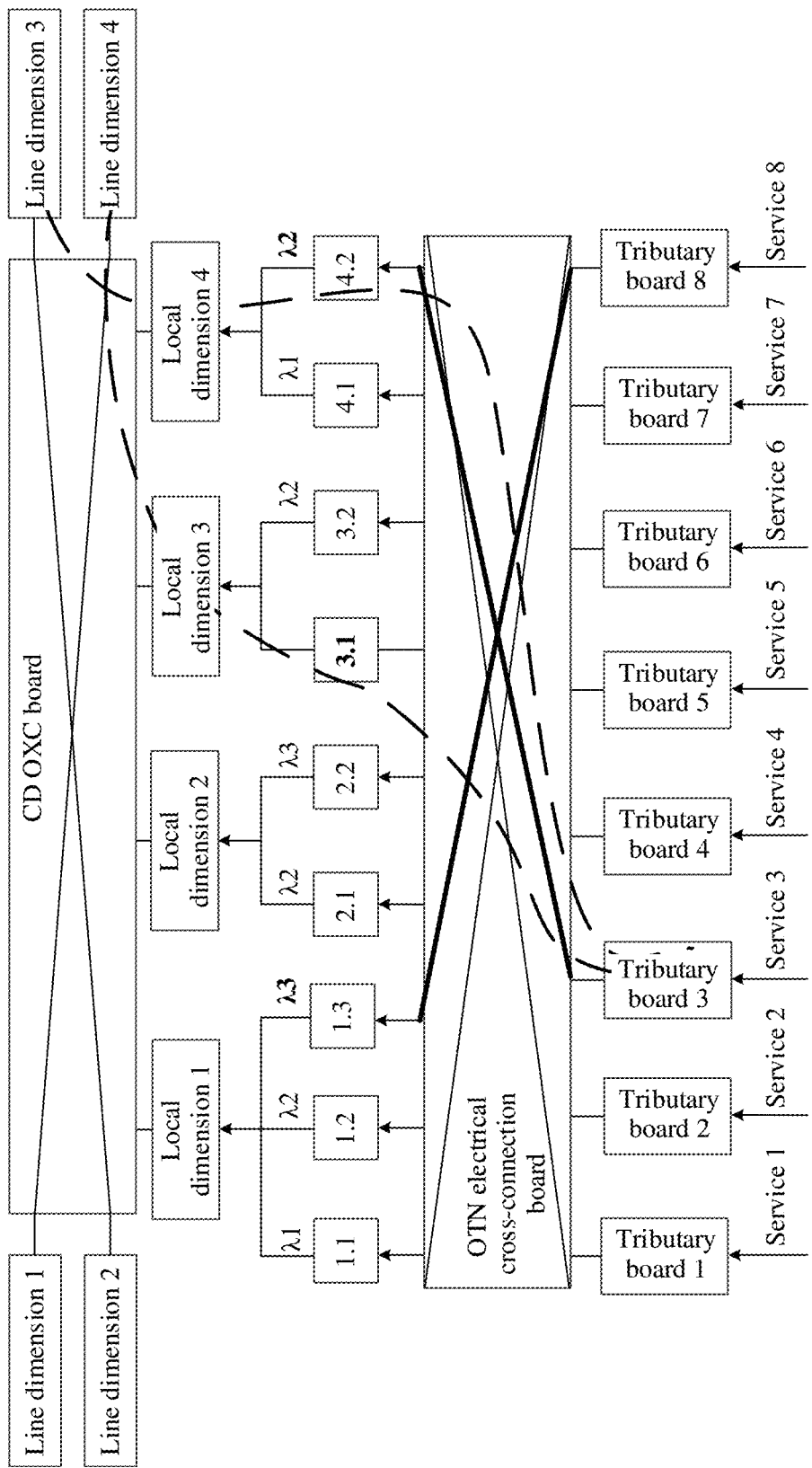
FIG. 7d is a fourth schematic diagram of a service path in a third implementation scenario according to an embodiment of this application.

Then, as shown in FIG. 7d, the operating wavelength of the line board 40.2 is adjusted to λ2, the service 3 received by the tributary board 3 is transmitted to the line board 40.2 through cross-connection by using the OTN electrical cross-connect board, and the CD OXC board is adjusted, so that a line dimension connected to the line board 40.2 is cross-connected to a rerouting line dimension. The rerouting line dimension is a line dimension whose occupied wavelength does not include λ2.

Fourth Implementation Scenario

Based on the third implementation scenario, if the faulty optical fiber is recovered, the first service blocked due to the faulty optical fiber may be returned from the rerouting path to the original routing path. In an optional manner, the control device determines, based on a fact that an optical fiber connected to a line dimension connected to the first local dimension is faulty, that the mapping wavelength of the first service received by the site is blocked on the original routing path. When determining that the faulty optical fiber is recovered, the control device may route the first service from the second line board connected to the second local dimension to the first line board connected to the first local dimension.

With reference to the examples in the third implementation scenario, the following describes how to reroute the first service to the original routing path.

In an example d1 corresponding to the foregoing example c1, the first service is the service 3, and when an optical fiber connected to a line dimension 4 on the original routing path (that is, a path on which the service 3 arrives at the line dimension 4 from the line board 30.1 by passing through the local dimension 3 in the example c1) on which the service 3 is located is faulty, the service 3 is adjusted to be transmitted on a rerouting path (that is, a path on which the service 3 is transmitted from the line board 30.1 to the line dimension 3 by passing through the local dimension 3 in the example c1). If the faulty optical fiber connected to the line dimension 4 on the original routing path on which the service 3 is located is recovered, the service 3 is returned from the rerouting path to the original routing path in terms of the transmission path.

In an example d2 corresponding to the foregoing example c2, the first service is the service 3, a routing path of the service 3 (that is, a path on which the service 3 arrives at the line dimension 4 from the line board 30.1 by passing through the local dimension 3 in the example c2) is not changed in the example c2, and the operating wavelength of the line board 30.1 is changed to the rerouting wavelength λ3. When the faulty optical fiber connected to the line dimension 4 in the transmission path of the service 3 is recovered, the operating wavelength of the line board 3.1 is adjusted to the wavelength λ1. In this way, the service 3 can still be transmitted on the original routing path.

In an example d3 corresponding to the foregoing example c3, when the first service is the service 2, and an optical fiber connected to the line dimension 3 on the original routing path (that is, a path on which the service 2 arrives at the line dimension 3 from the line board 2.1 by passing through the local dimension 2 in the example c3 in FIG. 7b) is faulty, the service 2 is adjusted to be transmitted from a rerouting path (that is, a path on which the service 2 arrives at the line dimension 1 from the line board 1.3 by passing through the local dimension 1 in the example c3). When the faulty optical fiber connected to the line dimension 3 on the original routing path on which the service 3 is located is recovered, the service 2 is returned from the rerouting path to the original routing path, and the service 2 is transmitted on the original routing path by using an original wavelength λ2. A specific rerouting return process is not described herein.

In an example d4 corresponding to the foregoing example c4, when the first service is the service 2, and an optical fiber connected to the line dimension 4 on the original routing path (that is, a path on which the service 3 arrives at the line dimension 4 from the line board 30.1 by passing through the local dimension 3 in the example c3 in FIG. 7a) on which the service 2 is located is faulty, the service 3 is adjusted to be transmitted from a rerouting path (that is, a path on which the service 2 arrives at the line dimension 3 from the line board 40.2 by passing through the local dimension 4 in the example c3 in FIG. 7d). When the faulty optical fiber connected to the line dimension 4 on the original routing path on which the service 3 is located is recovered, the service 3 is returned from the rerouting path to the original routing path, and the service 3 is transmitted on the original routing path by using an original wavelength λ1. A specific rerouting return process is not described herein.

In this embodiment of this application, the fourth scenario provided may provide more selections for transmitting the first service. If a faulty optical fiber is recovered, the first service may be transmitted on a rerouting path, or may be returned from a rerouting path to the original routing path for transmission. For example, if efficiency of transmitting the first service on the original routing path is higher than efficiency of transmitting the first service on the rerouting path, after the faulty optical fiber is recovered, the first service is returned from the rerouting path to the original routing path, so that the efficiency of transmitting the first service can be improved.

Based on a same technical concept, an embodiment of this application further provides a control device, configured to implement the method performed by the control device in the foregoing method embodiments.

Figure 8:
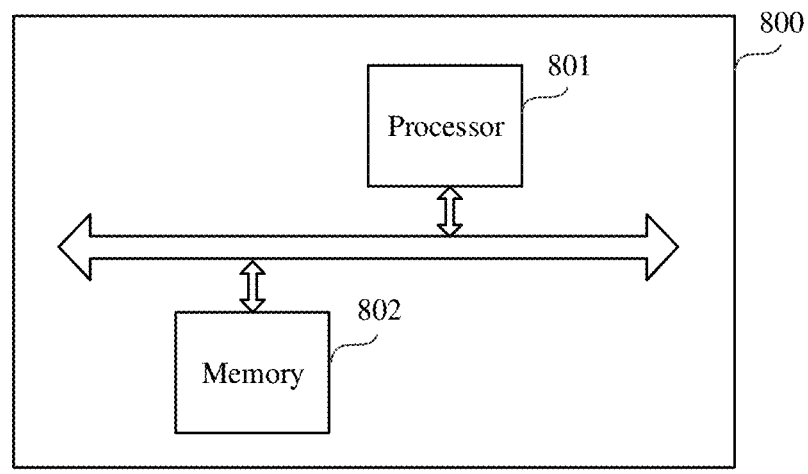
FIG. 8 is a schematic structural diagram of a control device 800 applicable to an embodiment of this application.

FIG. 8 is an example of a schematic structural diagram of a control device according to an embodiment of this application. As shown in FIG. 8, a control device 800 includes a processor 801 and a memory 802. The processor 801 and the memory 802 may be connected to each other by using a bus. The processor 801 may be a central processing unit (CPU) 801, a network processor (NP) 801, or a combination of the CPU and the NP. The processor 801 may further include a hardware chip. The hardware chip may be an application-specific integrated circuit (ASIC), a programmable logic device (PLD), or a combination thereof. The PLD may be a complex programmable logic device (CPLD), a field-programmable gate array (FPGA), generic array logic (GAL), or any combination thereof. The memory 802 is configured to store a software instruction. The processor 801 invokes the stored program instruction to perform one or more steps or optional implementations in the embodiments shown in the foregoing service processing methods. The memory 802 may include a nonvolatile memory 802, such as a UFS, an EMMC, or a flash memory 802, a hard disk drive (HDD), or a solid-state drive (SSD), or the memory 802 may include a combination of the foregoing types of memories 802. In a possible design, the memory 802 may also be integrated with the processor 801.

When invoking the computer program instruction stored in the memory 802, the processor 801 may determine that a site receives a first service; determine that a mapping wavelength of the first service is blocked on an original routing path, where the original routing path includes a first line board connected to a first local dimension, and a wavelength occupied by the first local dimension includes the mapping wavelength of the first service; and route the first service to a second line board connected to a second local dimension, where a local dimension of the mapping wavelength of the first service is available in the second local dimension.

In a possible design, if the second line board is in an idle state, the processor 801 may route the first service to the second line board in the second local dimension; or if the second line board is in a working state of processing a second service, the processor 801 routes the second service processed by the second line board to a third line board connected to a third local dimension, and routes the first service to the second line board, where the mapping wavelength corresponding to the second service is available in the third local dimension.

Specifically, the processor 801 may adjust an operating wavelength of the third line board to the mapping wavelength of the second service; control the second service to be sent to the second line board and the third line board, where a direction in which the second service is output from the second line board includes a first line dimension connected to the second local dimension; adjust the third local dimension to connect to the first line dimension, where a direction in which the second service is output from the third line board includes the first line dimension connected to the third local dimension; control the first line dimension to receive a signal of the second service sent from the third line board; and cancel sending of the second service to the second line board.

In a possible design, before the first service is transmitted to the first line board, the processor 801 may determine that the mapping wavelength of the first service is blocked on the original routing path; or when the first line board connected to the first local dimension is faulty, the processor 801 determines that the mapping wavelength of the first service is blocked on the original routing path; and when an optical fiber connected to a line dimension connected to the first local dimension is faulty, the processor 801 determines that the mapping wavelength of the first service is blocked on the original routing path.

When the processor 801 determines, based on a fact that an optical fiber connected to a line dimension connected to the first local dimension is faulty, that the mapping wavelength of the first service is blocked on the original routing path, after the faulty optical fiber has been recovered, the processor 801 may further reroute the first service from the second line board connected to the second local dimension to the first line board connected to the first local dimension.

Figure 9:
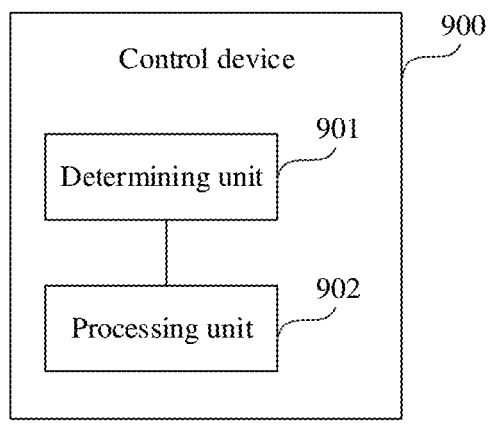
FIG. 9 is a schematic structural diagram of a control device 900 applicable to an embodiment of this application.

Based on the foregoing content and a same concept, this application provides a control device 900, configured to perform the service processing method performed by the foregoing control device. FIG. 9 is an example of a schematic structural diagram of a control device according to this application. As shown in FIG. 9, the control device 900 includes a determining unit 901 and a processing unit 902. It should be understood that the foregoing unit division of the control device is merely logical function division. During actual implementation, all or some units may be integrated into one physical entity, or may be physically separated. In this embodiment of this application, the determining unit 901 and the processing unit 902 in FIG. 9 may be implemented as the processor 801 in FIG. 8. In other words, in this embodiment of this application, the determining unit 901 and the processing unit 902 may perform the solution performed by the processor 801 in FIG. 8. For other content, refer to the foregoing content. Details are not described herein again.

All or some of the foregoing embodiments may be implemented by using software, hardware, or a combination thereof. When the software is used to implement the embodiments, all or some of the foregoing embodiments may be implemented in a form of a computer program product. The computer program product includes one or more instructions. When the computer program instructions are loaded and executed on a computer, the procedures or functions according to the embodiments of this application are all or partially generated. The computer may be a general-purpose computer, a special-purpose computer, a computer network, or another programmable apparatus. The instructions may be stored in a computer storage medium, or may be transmitted from a computer storage medium to another computer storage medium. For example, the instructions may be transmitted from a website, computer, server, or data center to another website, computer, server, or data center in a wired (for example, a coaxial cable, an optical fiber, or a twisted pair) or wireless (for example, infrared, radio, or microwave) manner. The computer storage medium may be any medium accessible by the computer, or a data storage device, such as a server or a data center, integrating one or more usable media. The medium may be a magnetic medium (for example, a floppy disk, a hard disk, a magnetic tape, or magneto-optical disc (MO)), an optical medium (for example, a compact disc), a semiconductor medium (for example, a ROM, an EPROM, an EEPROM, a solid-state disk (SSD)), or the like.

The embodiments of this application are described with reference to the flowcharts and/or block diagrams of the method, the device (system), and the computer program product according to the embodiments of this application. It should be understood that instructions may be used to implement each process and/or each block in the flowcharts and/or the block diagrams and a combination of a process and/or a block in the flowcharts and/or the block diagrams.

These instructions may be provided for a general-purpose computer, a special-purpose computer, an embedded processor, or a processor of any other programmable data processing device to generate a machine, so that the instructions executed by a computer or a processor of any other programmable data processing device generate an apparatus for implementing a specific function in one or more processes in the flowcharts and/or in one or more blocks in the block diagrams.

These computer program instructions may be stored in a computer readable memory that can instruct the computer or any other programmable data processing device to work in a specific manner, so that the instructions stored in the computer readable memory generate an artifact that includes an instruction apparatus. The instruction apparatus implements a specific function in one or more processes in the flowcharts and/or in one or more blocks in the block diagrams.

These computer program instructions may be loaded onto a computer or another programmable data processing device, so that a series of operations and steps are performed on the computer or the another programmable device, thereby generating computer-implemented processing. Therefore, the instructions executed on the computer or the another programmable device provide steps for implementing a specific function in one or more processes in the flowcharts and/or in one or more blocks in the block diagrams.

Obviously, a person skilled in the art can make various modifications and variations to this application without departing from the scope of this application. This application is intended to cover these modifications and variations of this application provided that they fall within the scope of protection defined by the following claims and their equivalent technologies.

What is claimed is:

1. A method, comprising:
   determining, by a control device, that a site receives a first service;
   determining, by the control device, that a mapping wavelength of the first service is blocked on a first routing path, wherein the first routing path comprises a first line board connected to a first local dimension, and a wavelength occupied by the first local dimension comprises the mapping wavelength of the first service; and
   routing, by the control device, the first service to a second line board connected to a second local dimension, wherein the mapping wavelength of the first service is available in the second local dimension, and wherein routing the first service to the second line board connected to the second local dimension comprises:
      in response to the second line board being in an idle state, routing the first service to the second line board in the second local dimension; or
      in response to the second line board being in a working state of processing a second service, routing the second service processed by the second line board to a third line board connected to a third local dimension, and routing the first service to the second line board, wherein a mapping wavelength of the second service is available in the third local dimension.

2. The method according to claim 1, wherein routing the second service processed by the second line board to the third line board connected to the third local dimension comprises:
   adjusting, by the control device, an operating wavelength of the third line board to the mapping wavelength of the second service;
   controlling, by the control device, the second service to be sent to the second line board and the third line board, wherein a direction in which the second service is output from the second line board comprises a direction in which a first line dimension is connected to the second local dimension;
   adjusting, by the control device, the third local dimension to connect to the first line dimension, wherein a direction in which the second service is output from the third line board comprises a direction in which the first line dimension is connected to the third local dimension;
   controlling, by the control device, the first line dimension to receive a signal of the second service sent from the third line board; and
   cancelling, by the control device, subsequent sending of the second service to the second line board.

3. The method according to claim 1, wherein determining that the mapping wavelength of the first service is blocked on the first routing path comprises:
   in response to the control device determining, before the first service is transmitted to the first line board, that the mapping wavelength of the first service is blocked on the first routing path, or determining that the first line board connected to the first local dimension is faulty, or determining that an optical fiber connected to a line dimension connected to the first local dimension is faulty, determining that the mapping wavelength of the first service is blocked on the first routing path.

4. The method according to claim 1, wherein:
   determining, by the control device, that the mapping wavelength of the first service is blocked on the first routing path comprises:
      determining, by the control device based on determining that an optical fiber connected to a line dimension connected to the first local dimension is faulty, that the mapping wavelength of the first service received by the site is blocked on the first routing path; and
   the method further comprises:
      determining, by the control device, that the faulty optical fiber has been recovered; and
      routing, by the control device, the first service from the second line board connected to the second local dimension to the first line board connected to the first local dimension.

5. The method according to claim 1, wherein the first service is blocked when the first service is a newly delivered service and the mapping wavelength of the first service has been used for another service in the first local dimension.

6. The method according to claim 1, wherein the first service is blocked when the first line board that receives the first service is faulty.

7. The method according to claim 1, wherein the first service is blocked when an external optical fiber of the site is faulty.

8. The method according to claim 1, wherein the mapping wavelength of the first service is a wavelength used for mapping the first service into an optical signal for transmission.

9. A control device, comprising:
   a processor; and
   a non-transitory memory, wherein the non-transitory memory is configured to store a program instruction, and the processor is configured to read the program instruction in the memory to implement the following operations:
determining that a site receives a first service;
determining that a mapping wavelength of the first service is blocked on a first routing path, wherein the first routing path comprises a first line board connected to a first local dimension, and a wavelength occupied by the first local dimension comprises the mapping wavelength of the first service; and
routing the first service to a second line board connected to a second local dimension, wherein a local dimension of the mapping wavelength of the first service is available in the second local dimension, and wherein routing the first service to the second line board connected to the second local dimension comprises:
in response to the second line board being in an idle state, routing the first service to the second line board in the second local dimension; or
in response to the second line board being in a working state of processing a second service, routing the second service processed by the second line board to a third line board connected to a third local dimension, and routing the first service to the second line board, wherein a mapping wavelength of the second service is available in the third local dimension.

10. The control device according to claim 9, wherein the processor is configured to read the program instruction in the memory to implement the following operations:
adjust an operating wavelength of the third line board to the mapping wavelength of the second service;
control the second service to be sent to the second line board and the third line board, wherein a direction in which the second service is output from the second line board comprises a direction in which a first line dimension is connected to the second local dimension;
adjust the third local dimension to connect to the first line dimension, wherein a direction in which the second service is output from the third line board comprises a direction in which the first line dimension is connected to the third local dimension;
control the first line dimension to receive a signal of the second service sent from the third line board; and
cancel sending of the second service to the second line board.

11. The control device according to claim 9, wherein the processor is configured to read the program instruction in the memory to implement the following operations:
in response to determining, before the first service is transmitted to the first line board, that the mapping wavelength of the first service is blocked on the first routing path, or determining that the first line board connected to the first local dimension is faulty, or determining that an optical fiber connected to a line dimension connected to the first local dimension is faulty, determine that the mapping wavelength of the first service is blocked on the first routing path.

12. The control device according to claim 9, wherein the processor is further configured to read the program instruction in the memory to implement the following operations:
determine, based on an optical fiber that is connected to a line dimension connected to the first local dimension is faulty, that the mapping wavelength of the first service received by the site is blocked on the first routing path;
determine that the faulty optical fiber has been recovered; and
route the first service from the second line board connected to the second local dimension to the first line board connected to the first local dimension.

13. The control device according to claim 9, wherein the mapping wavelength of the first service is a wavelength used for mapping the first service into an optical signal for transmission.

14. The control device according to claim 9, wherein the first service is blocked when the first service is a newly delivered service and the mapping wavelength of the first service has been used for another service in the first local dimension.

15. A non-transitory storage medium storing a program that is executable by one or more processors, the program including instructions for:
determining that a site receives a first service;
determining that a mapping wavelength of the first service is blocked on a first routing path, wherein the first routing path comprises a first line board connected to a first local dimension, and a wavelength occupied by the first local dimension comprises the mapping wavelength of the first service; and
routing the first service to a second line board connected to a second local dimension, wherein a local dimension of the mapping wavelength of the first service is available in the second local dimension, and wherein routing the first service to the second line board connected to the second local dimension comprises:
in response to the second line board being in an idle state, routing the first service to the second line board in the second local dimension; or
in response to the second line board being in a working state of processing a second service, routing the second service processed by the second line board to a third line board connected to a third local dimension, and routing the first service to the second line board, wherein a mapping wavelength of the second service is available in the third local dimension.

16. The non-transitory storage medium according to claim 15, wherein routing the second service processed by the second line board to the third line board connected to the third local dimension comprises:
adjusting an operating wavelength of the third line board to the mapping wavelength of the second service;
controlling the second service to be sent to the second line board and the third line board, wherein a direction in which the second service is output from the second line board comprises a direction in which a first line dimension is connected to the second local dimension;
adjusting the third local dimension to connect to the first line dimension, wherein a direction in which the second service is output from the third line board comprises a direction in which the first line dimension is connected to the third local dimension;
controlling the first line dimension to receive a signal of the second service sent from the third line board; and
cancelling subsequent sending of the second service to the second line board.

17. The non-transitory storage medium according to claim 15, wherein determining that the mapping wavelength of the first service is blocked on the first routing path comprises:
in response to determining, before the first service is transmitted to the first line board, that the mapping wavelength of the first service is blocked on the first routing path, determining that the mapping wavelength of the first service is blocked on the first routing path.

18. The non-transitory storage medium according to claim 15, wherein determining that the mapping wavelength of the first service is blocked on the first routing path comprises:
   in response to determining that the first line board connected to the first local dimension is faulty, determining that the mapping wavelength of the first service is blocked on the first routing path.

19. The non-transitory storage medium according to claim 15, wherein determining that the mapping wavelength of the first service is blocked on the first routing path comprises:
   in response to determining that an optical fiber connected to a line dimension connected to the first local dimension is faulty, determining that the mapping wavelength of the first service is blocked on the first routing path.

20. The non-transitory storage medium according to claim 15, wherein:
   determining that the mapping wavelength of the first service is blocked on the first routing path comprises:
      determining, based on determining that an optical fiber connected to a line dimension connected to the first local dimension is faulty, that the mapping wavelength of the first service received by the site is blocked on the first routing path; and
   the program further includes instructions for:
      determining that the faulty optical fiber has been recovered; and
      routing the first service from the second line board connected to the second local dimension to the first line board connected to the first local dimension.

\* \* \* \* \*